(12) United States Patent
Taguchi et al.

(10) Patent No.: US 12,151,738 B2
(45) Date of Patent: Nov. 26, 2024

(54) STEERING COLUMN DEVICE

(71) Applicant: NSK LTD., Tokyo (JP)

(72) Inventors: Yuichiro Taguchi, Maebashi (JP); Shin Yamamoto, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/043,170

(22) PCT Filed: Aug. 31, 2021

(86) PCT No.: PCT/JP2021/031858
§ 371 (c)(1),
(2) Date: Feb. 27, 2023

(87) PCT Pub. No.: WO2022/045346
PCT Pub. Date: Mar. 3, 2022

(65) Prior Publication Data
US 2023/0311973 A1 Oct. 5, 2023

(30) Foreign Application Priority Data

Aug. 31, 2020 (JP) ................................. 2020-145213

(51) Int. Cl.
*B62D 1/187* (2006.01)
*B62D 1/181* (2006.01)

(52) U.S. Cl.
CPC ............. *B62D 1/187* (2013.01); *B62D 1/181* (2013.01)

(58) Field of Classification Search
CPC ......... B62D 1/187; B62D 1/181; B62D 1/189
See application file for complete search history.

(56) References Cited

U.S. PATENT DOCUMENTS

| 5,737,971 | A | 4/1998 | Riefe et al. | |
|---|---|---|---|---|
| 11,919,565 | B2* | 3/2024 | Park | B62D 1/181 |
| 2003/0172765 | A1* | 9/2003 | Heiml | B62D 1/184 |
| | | | | 280/775 |

(Continued)

FOREIGN PATENT DOCUMENTS

| JP | 2011-178304 A | 9/2011 |
|---|---|---|
| JP | 2015-227166 A | 12/2015 |
| JP | 2017-81215 A | 5/2017 |

OTHER PUBLICATIONS

International Search Report (PCT/ISA/210) dated Nov. 9, 2021, issued by the International Searching Authority in counterpart International Application No. PCT/JP2021/031858.

(Continued)

*Primary Examiner* — Jason D Shanske
*Assistant Examiner* — Shams Dhanani
(74) *Attorney, Agent, or Firm* — Sughrue Mion, PLLC

(57) ABSTRACT

A steering column device includes a steering column; and a telescopic actuator. The steering column includes a first column member, a second column member assembled to the first column member in a manner of being displaceable relative to the first column member in an axial direction, and a low-friction sliding member disposed between the first column member and the second column member. The telescopic actuator includes a telescopic motor, and displaces the second column member in the axial direction with respect to the first column member by using the telescopic motor as a drive source.

13 Claims, 21 Drawing Sheets

(56) References Cited

U.S. PATENT DOCUMENTS

| | | | | |
|---|---|---|---|---|
| 2006/0207378 | A1* | 9/2006 | Kramer | B62D 1/187 |
| | | | | 74/492 |
| 2010/0242663 | A1* | 9/2010 | Takezawa | B62D 1/184 |
| | | | | 74/493 |
| 2012/0198956 | A1* | 8/2012 | Takezawa | B62D 1/184 |
| | | | | 74/493 |
| 2013/0160596 | A1* | 6/2013 | Tanaka | B62D 1/189 |
| | | | | 74/493 |
| 2015/0069745 | A1* | 3/2015 | Iwakawa | B62D 1/185 |
| | | | | 280/775 |
| 2015/0075316 | A1 | 3/2015 | Iwakawa et al. | |
| 2015/0090067 | A1 | 4/2015 | Iwakawa et al. | |
| 2015/0344062 | A1* | 12/2015 | Johta | B62D 1/195 |
| | | | | 74/493 |
| 2016/0311459 | A1* | 10/2016 | Takahashi | B62D 1/185 |
| 2016/0311460 | A1* | 10/2016 | Imagaki | B62D 1/187 |
| 2017/0029009 | A1 | 2/2017 | Rouleau | |
| 2017/0113711 | A1 | 4/2017 | Matsuno et al. | |
| 2017/0240199 | A1* | 8/2017 | Nagatani | B62D 1/195 |
| 2018/0001845 | A1* | 1/2018 | Orihara | B62D 1/187 |
| 2018/0229757 | A1* | 8/2018 | Yamaoka | B62D 1/192 |
| 2018/0281840 | A1* | 10/2018 | Yoon | B62D 1/187 |
| 2019/0111960 | A1* | 4/2019 | Freudenstein | B62D 1/185 |
| 2019/0152510 | A1* | 5/2019 | Shiroishi | B62D 1/189 |
| 2019/0210632 | A1* | 7/2019 | Derocher | B62D 1/181 |
| 2019/0300041 | A1* | 10/2019 | Kurokawa | B62D 1/184 |
| 2019/0300042 | A1* | 10/2019 | Derocher | B62D 1/185 |
| 2020/0039565 | A1* | 2/2020 | Harada | B62D 1/187 |
| 2020/0039567 | A1* | 2/2020 | Sekiguchi | B62D 1/192 |
| 2020/0039568 | A1* | 2/2020 | Sekiguchi | B62D 1/181 |
| 2020/0070869 | A1* | 3/2020 | Shiroishi | B62D 1/184 |
| 2020/0094866 | A1* | 3/2020 | Kurokawa | B62D 1/185 |
| 2020/0172149 | A1* | 6/2020 | Appleyard | B62D 1/185 |
| 2020/0331514 | A1* | 10/2020 | Strong | B62D 1/185 |
| 2021/0009186 | A1* | 1/2021 | Sugishita | B62D 1/18 |
| 2021/0024120 | A1* | 1/2021 | Rey | B62D 1/195 |
| 2021/0031822 | A1* | 2/2021 | Watanabe | B62D 1/183 |
| 2021/0039706 | A1* | 2/2021 | Schmidt | B62D 1/181 |
| 2021/0061340 | A1* | 3/2021 | Wilkes | F16H 25/20 |
| 2021/0188342 | A1* | 6/2021 | Bayer | B62D 5/006 |
| 2021/0237791 | A1* | 8/2021 | Geiselberger | B62D 1/195 |
| 2022/0048554 | A1* | 2/2022 | Sugishita | B62D 1/184 |
| 2022/0048555 | A1* | 2/2022 | Park | B62D 1/184 |
| 2022/0063703 | A1* | 3/2022 | McClelland | B62D 1/192 |
| 2022/0274639 | A1* | 9/2022 | Park | B62D 1/183 |
| 2022/0297741 | A1* | 9/2022 | Homma | B62D 1/185 |
| 2023/0081714 | A1* | 3/2023 | Homma | B62D 1/181 |
| | | | | 74/493 |
| 2023/0084605 | A1* | 3/2023 | Huber | B62D 1/181 |
| | | | | 74/493 |
| 2023/0136638 | A1* | 5/2023 | Homma | B62D 1/195 |
| | | | | 74/493 |
| 2023/0182802 | A1* | 6/2023 | Bayer | B62D 1/185 |
| | | | | 280/775 |
| 2023/0264732 | A1* | 8/2023 | Huber | F16H 57/0464 |
| | | | | 280/775 |
| 2023/0311973 | A1* | 10/2023 | Taguchi | B62D 1/181 |
| | | | | 74/493 |
| 2023/0406396 | A1* | 12/2023 | Yamada | B62D 1/189 |
| 2024/0001984 | A1* | 1/2024 | Schnitzer | B62D 1/184 |

OTHER PUBLICATIONS

Written Opinion (PCT/ISA/237) dated Nov. 9, 2021, issued by the International Searching Authority in counterpart International Application No. PCT/JP2021/031858.

European Search Report issued in EP 21861767.8 dated Sep. 18, 2024.

* cited by examiner

STEERING COLUMN DEVICE

CROSS-REFERENCE TO RELATED APPLICATIONS

This application is a National Phase Entry of PCT International Application No. PCT/JP2021/031858, filed on Aug. 31, 2021, which claims priority to Japanese Patent Application No. 2020-145213, filed on Aug. 31, 2020, the contents of all of which are incorporated herein by reference in their entirety.

TECHNICAL FIELD

The present invention relates to a steering column device that extends and contracts a steering column over an entire length thereof by using an electric motor as a drive source.

BACKGROUND ART

In recent years, automatic driving techniques for automobiles have rapidly progressed. Therefore, in the near future, it is considered that a level of automatic driving reaches a level (levels 3 and 4) at which an automobile performs driving automatically under a specific condition or a level (level 5) of fully automatic driving. In an automobile equipped with such an automatic driving technique, it is not necessary for a driver to operate a steering wheel.

CITATION LIST

Patent Literature

Patent Literature 1: US 2019/210632 A

SUMMARY OF INVENTION

Technical Problem

In the automatic driving, it is preferable to largely displace the steering wheel forward and store the steering wheel on an inner side of a dashboard, thereby securing a large space in front of a driver seat. In order to store the steering wheel on the inner side of the dashboard, it is necessary to secure a sufficient amount of extension and contraction of the steering column.

US 2019/210632 A (Patent Literature 1) discloses a steering column in which three jackets are assembled telescopically to ensure a sufficient amount of extension and contraction over an entire length. Specifically, the steering column is configured such that an upper jacket and a middle jacket are fitted to each other via a plurality of balls so as to be able to extend and contract, and the middle jacket and a lower jacket are fitted to each other via a plurality of balls so as to be able to extend and contract. When such a steering column is extended or contracted, the upper jacket is displaced in an axial direction relative to the middle jacket by driving an upper side motor to rotate a screw shaft and moving a nut screwed to the screw shaft in the axial direction, and/or the middle jacket is displaced in the axial direction relative to the lower jacket by driving a lower side motor to rotate the screw shaft and moving the nut screwed to the screw shaft in the axial direction.

In the steering column described in US 2019/210632 A, in order to prevent rattling between the jackets, it is necessary to apply a preload to the plurality of balls held between the jackets. However, when a preload is applied to these balls, rolling resistance of the balls increases when the jackets are displaced relative to each other in the axial direction, and a problem arises in that an extension and contraction speed of the steering column decreases. If a motor having a large output torque is used as the motor for rotating the screw shaft, the extension and contraction speed of the steering column can be sufficiently ensured, but a problem arises in that the motor is increased in size.

In view of the above-described circumstances, an object of the present invention is to provide a steering column device capable of sufficiently securing an extension and contraction speed.

Solution to Problem

The object of the present invention is achieved by the following configuration.

(1) A steering column device including:
   a steering column; and
   a telescopic actuator, in which
   the steering column includes:
   a first column member,
   a second column member assembled to the first column member in a manner of being displaceable relative to the first column member in an axial direction, and
   a low-friction sliding member disposed between the first column member and the second column member, and
   the telescopic actuator includes a telescopic motor, and displaces the second column member in the axial direction with respect to the first column member by using the telescopic motor as a drive source.

(2) The steering column device described in (1), in which
   the steering column includes a fixing bracket, a column holder assembled to the fixing bracket in a manner of being displaceable relative to the fixing bracket in the axial direction, and an upper column assembled to the column holder in a manner of being displaceable relative to the column holder in the axial direction, and the low-friction sliding member is disposed at least between the fixing bracket and the column holder or between the column holder and the upper column, and
   the steering column device further includes:
   a lower telescopic actuator including a lower telescopic motor and configured to displace the column holder in the axial direction with respect to the fixing bracket by using the lower telescopic motor as a drive source; and
   an upper telescopic actuator including an upper telescopic motor and configured to displace the upper column in the axial direction with respect to the column holder by using the upper telescopic motor as a drive source.

(3) The steering column device described in (2), in which
   the column holder includes a displacement bracket supported by the fixing bracket in a manner of being displaceable relative to the fixing bracket in the axial direction, and a lower column supported by the displacement bracket in a manner of being swingable relative to the displacement bracket in an upper-lower direction, and
   the steering column device further includes: a tilt actuator including a tilt motor and configured to displace the lower column in the upper-lower direction with respect to the displacement bracket by using the tilt motor as a drive source.

(4) The steering column device described in (1), in which
the steering column includes a fixing bracket, a column holder assembled to the fixing bracket in a manner of being displaceable relative to the fixing bracket in the axial direction, and an upper column assembled to the column holder in a manner of being displaceable relative to the column holder in the axial direction,
the column holder includes a displacement bracket supported by the fixing bracket in a manner of being displaceable relative to the fixing bracket in the axial direction, and a lower column supported by the displacement bracket in a manner of being swingable relative to the displacement bracket in an upper-lower direction, and
the low-friction sliding member is disposed inward of an outer peripheral surface of the lower column in a width direction.

(5) The steering column device described in (4), in which
the low-friction sliding member is disposed between the fixing bracket and the displacement bracket,
the displacement bracket has a thick portion, and
the low-friction sliding member is disposed at the thick portion.

(6) The steering column device described in (5), in which
the thick portion is disposed inward of the outer peripheral surface of the lower column in the width direction.

(7) The steering column device described in (5) or (6), in which
a thickness of a portion of the thick portion adjacent to a location at which the low-friction sliding member is disposed is larger than a thickness of a portion of the fixing bracket adjacent to the location at which the low-friction sliding member is disposed.

(8) The steering column device described in any one of (1) to (7), in which
the low-friction sliding member is a linear guide, and
the linear guide includes:
a guide rail extending along the axial direction, and
a slider assembled to the guide rail in a manner of being displaceable in the axial direction along the guide rail.

(9) The steering column device described in (8), in which
the linear guide is disposed between the fixing bracket and the displacement bracket.

(10) The steering column device described in (9), in which
the displacement bracket has a through hole, which penetrates in an upper-lower direction, in an upper portion thereof, and
the slider has a screw hole opened to a lower surface thereof, and is supported and fixed to an upper surface of the displacement bracket by screwing a support bolt inserted into the through hole from below with the screw hole, and
the guide rail is supported and fixed to a lower surface of the fixing bracket.

(11) The steering column device described in (10), in which
the through hole is disposed in each of both side portions in a width direction so as to sandwich a central axis of the steering column, and the screw hole is disposed in each of both side portions in the width direction so as to sandwich the central axis of the steering column.

(12) The steering column device described in any one of (1) to (7), in which
the low-friction sliding member is a rolling member.

(13) The steering column device described in (12), in which
the rolling member is disposed at two locations in a width direction so as to face each other in the width direction.

(14) The steering column device described in any one of (1) to (7), in which
the low-friction sliding member is a sliding member.

(15) The steering column device described in (14), in which
the sliding member is disposed at two locations in a width direction so as to face each other in the width direction.

Advantageous Effects of Invention

According to the steering column device of the present invention, the extension and contraction speed can be sufficiently secured.

BRIEF DESCRIPTION OF DRAWINGS

FIGS. 11A to 11D are side views showing the steering device according to the first example of the embodiment of the present invention, in which FIG. 11A shows a state in which a column holder is moved to a rearmost side with respect to a fixing bracket and an upper column is moved to a rearmost side with respect to the column holder, FIG. 11B shows a state in which the column holder is moved to a foremost side with respect to the fixing bracket and the upper column is moved to the rearmost side with respect to the column holder, FIG. 11C shows a state in which the column holder is moved to the rearmost side with respect to the fixing bracket and the upper column is moved to a foremost side with respect to the column holder, and FIG. 11D shows a state in which the column holder is moved to a foremost side with respect to the fixing bracket and the upper column is moved to the foremost side with respect to the column holder.

DESCRIPTION OF EMBODIMENTS

Figure 1:
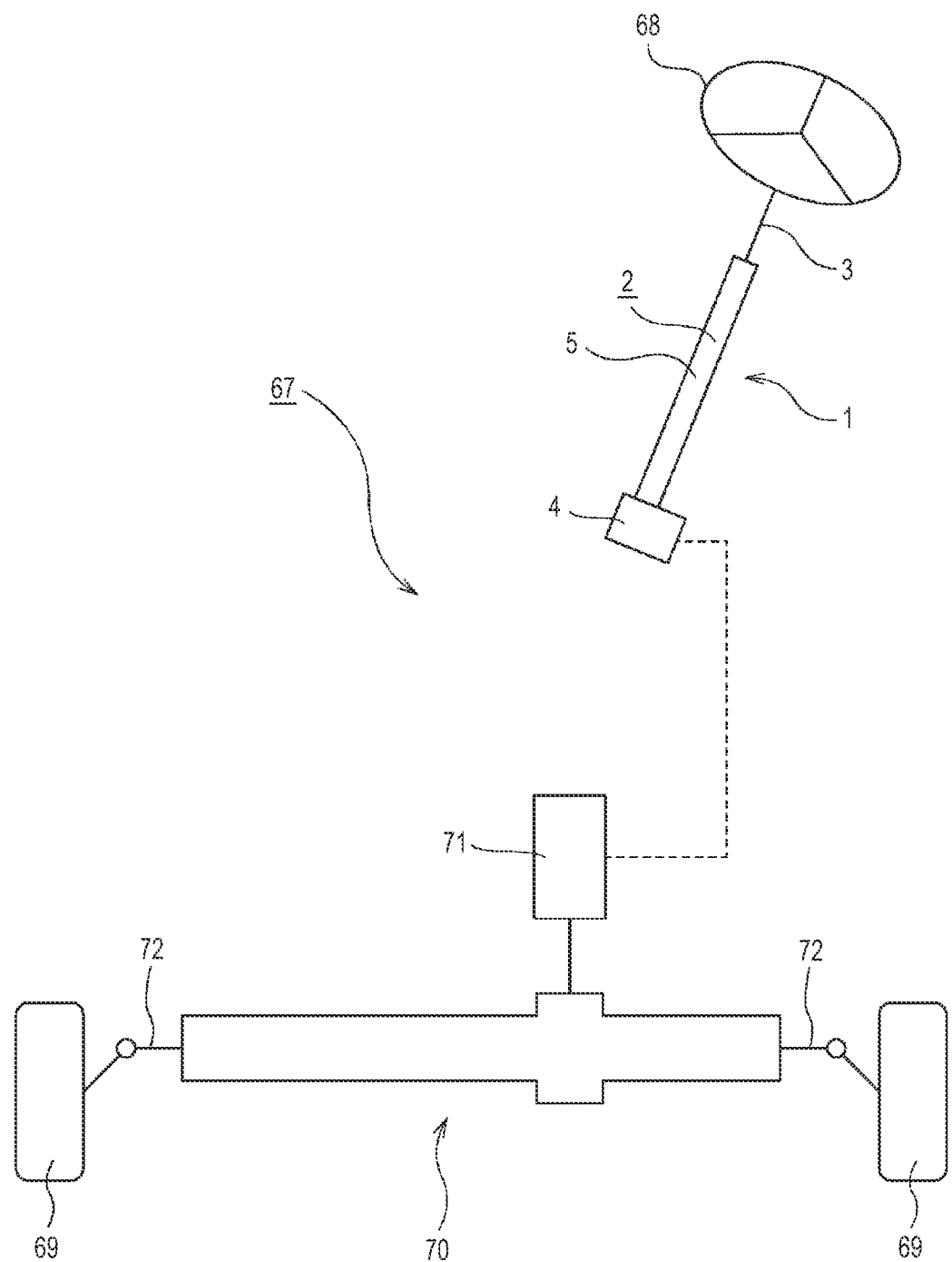
FIG. 1 is a schematic diagram showing a steering system in which a steering device according to a first example of an embodiment of the present invention is incorporated.
Figure 2:
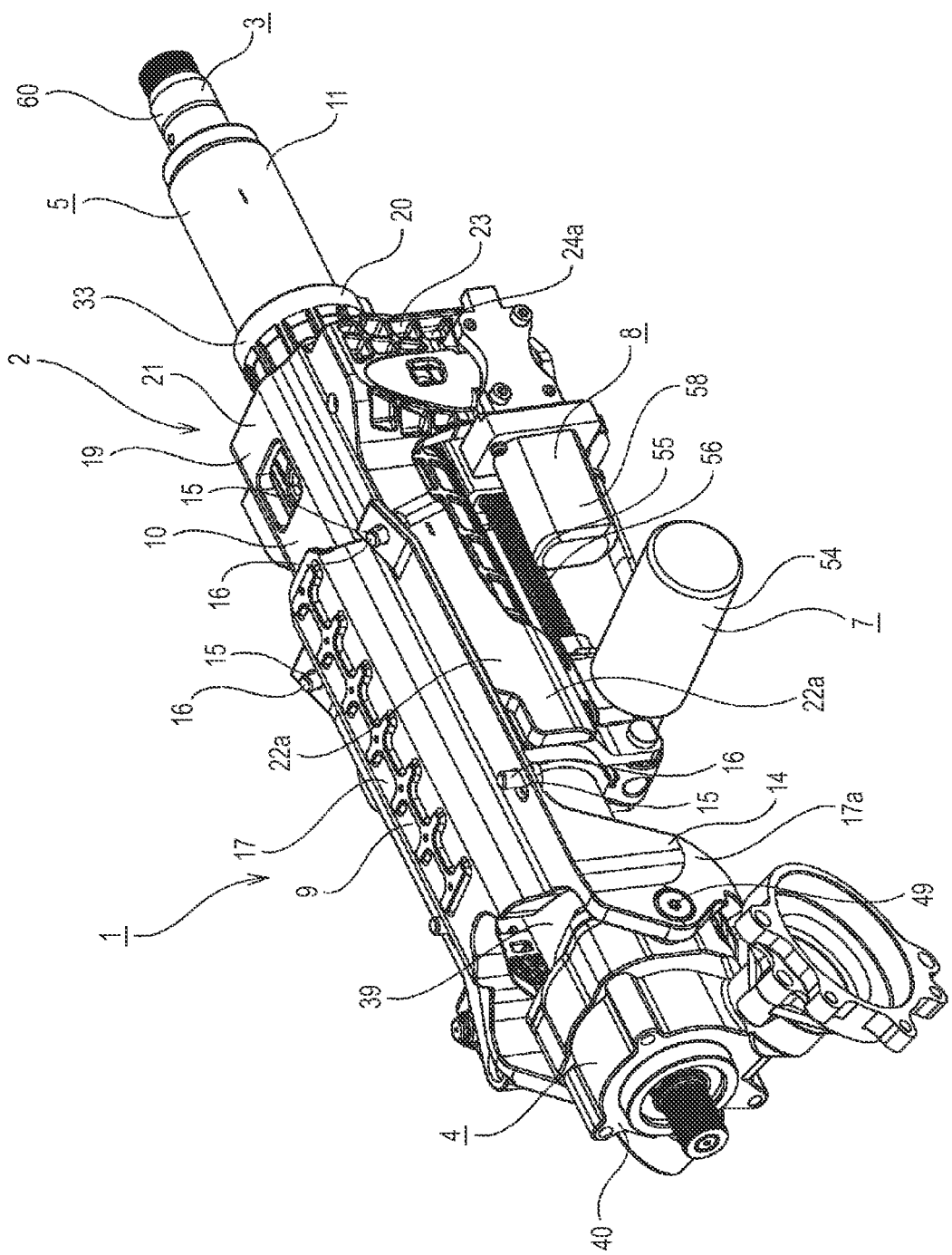
FIG. 2 is a perspective view showing the steering device according to the first example of the embodiment of the present invention.
Figure 3:
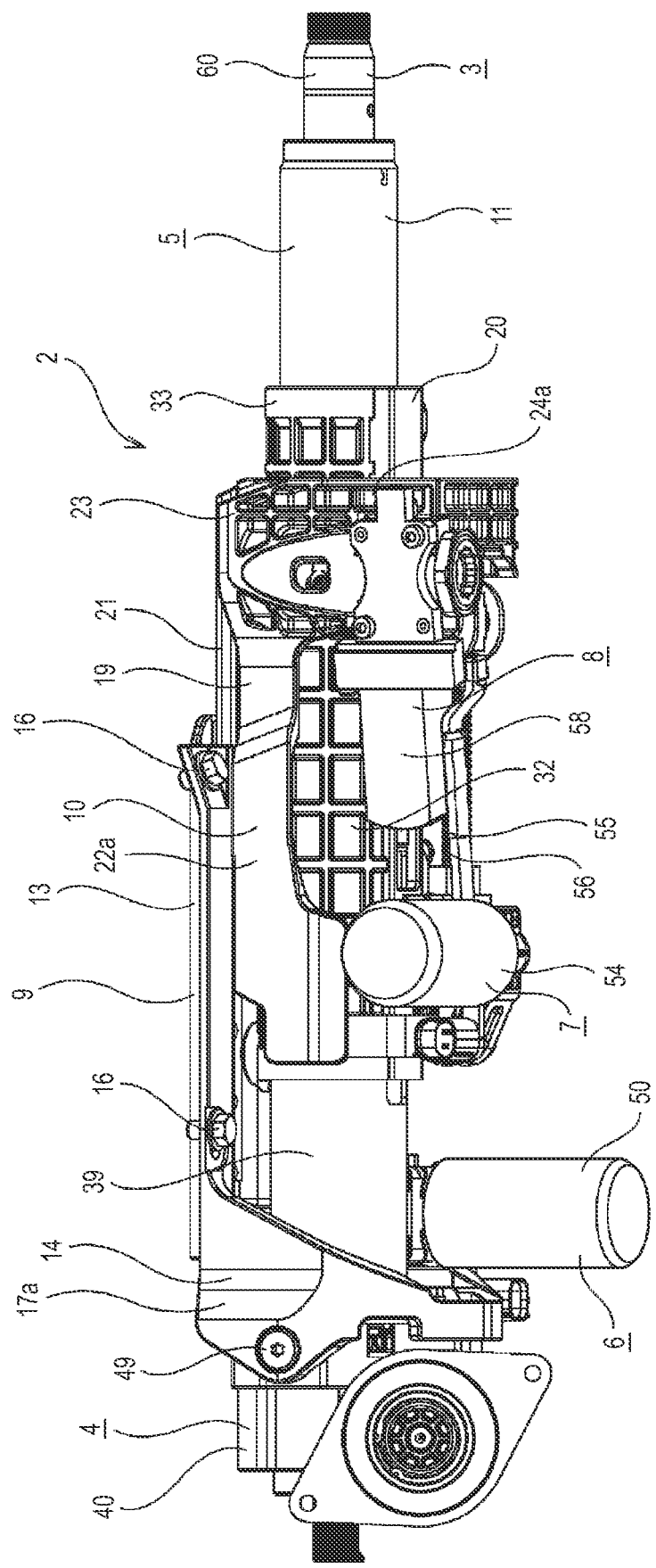
FIG. 3 is a side view showing the steering device according to the first example of the embodiment of the present invention.
Figure 4:
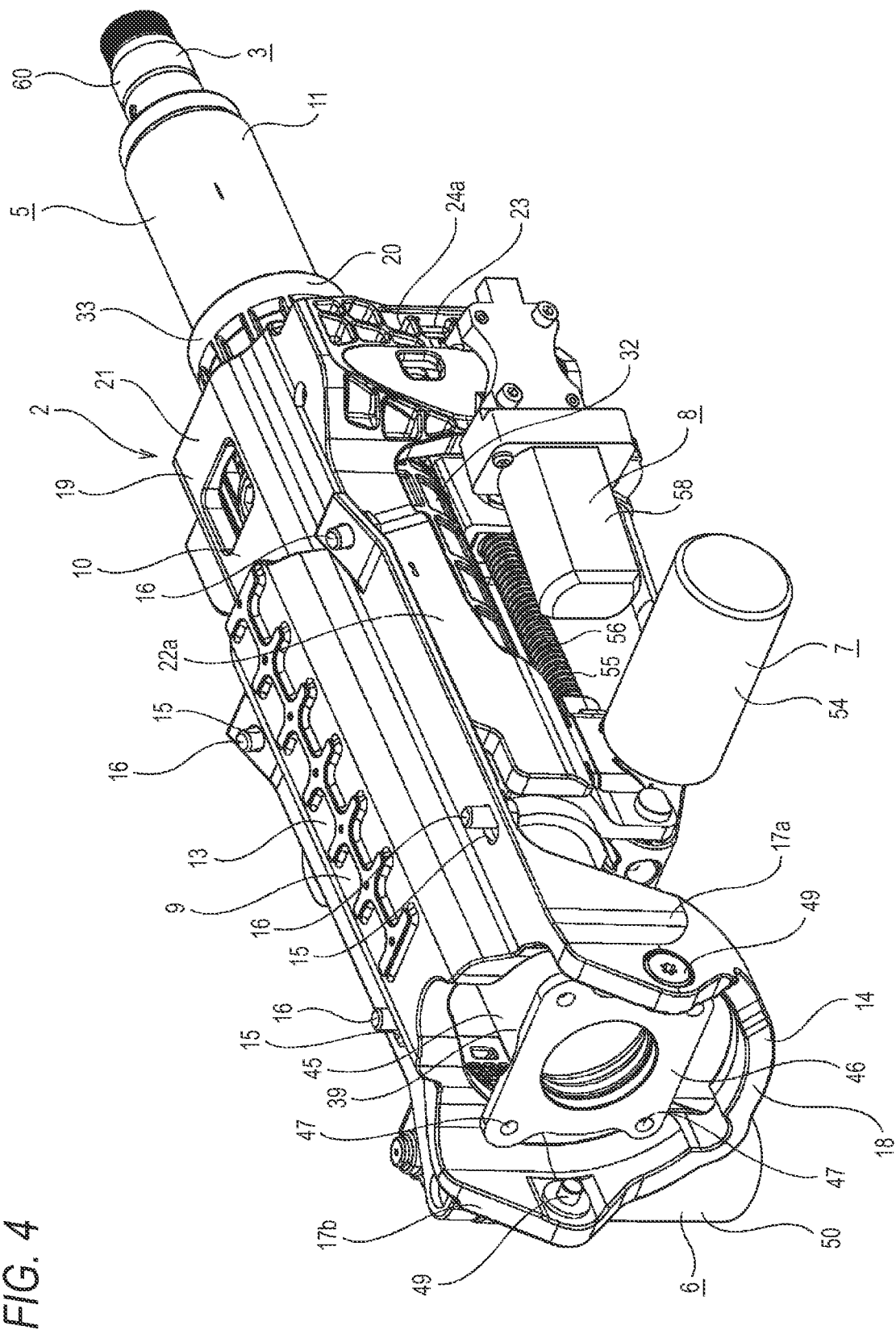
FIG. 4 is a perspective view showing the steering device according to the first example of the embodiment of the present invention.
Figure 5:
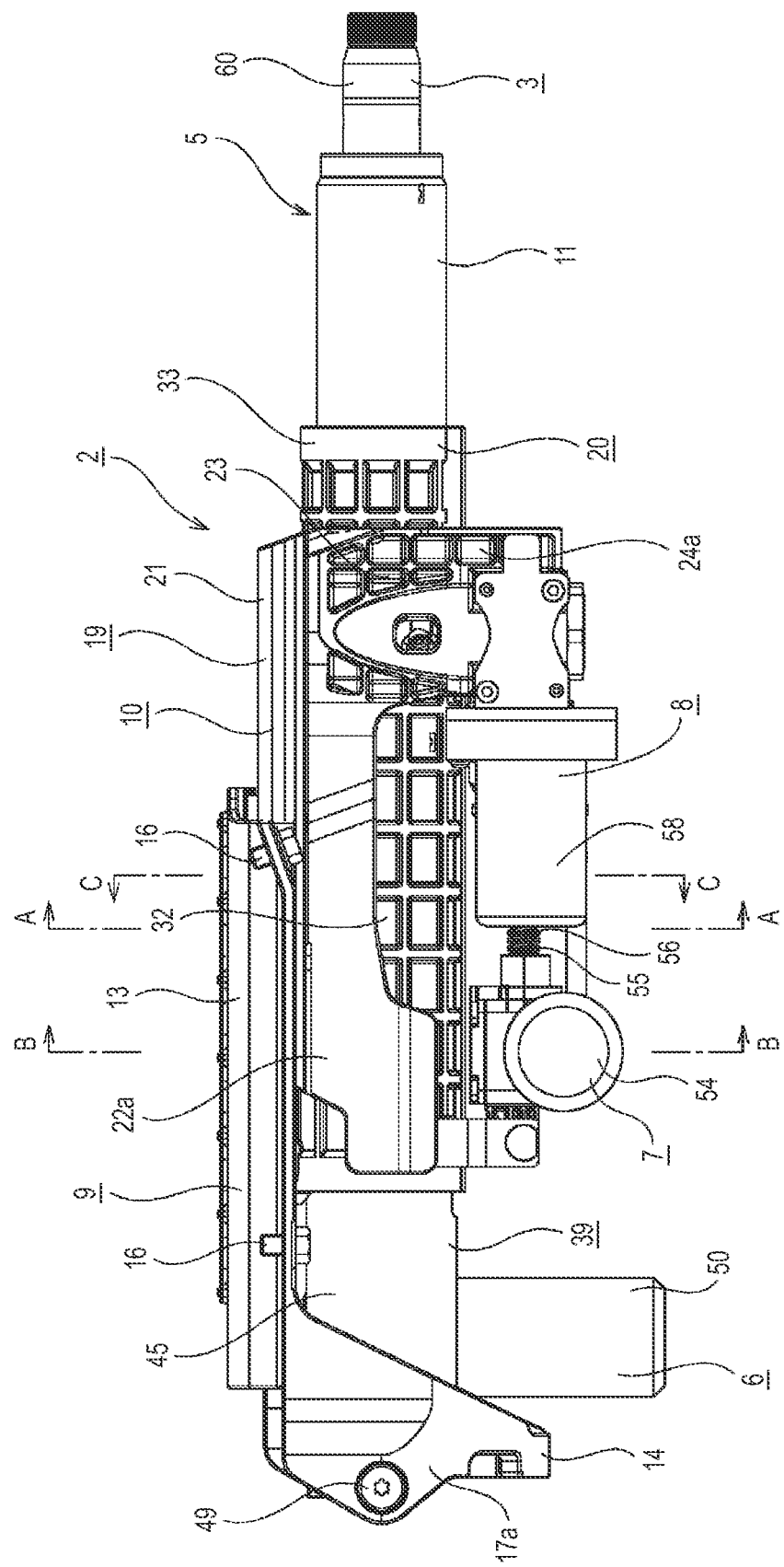
FIG. 5 is a side view showing the steering device according to the first example of the embodiment of the present invention.
Figure 6:
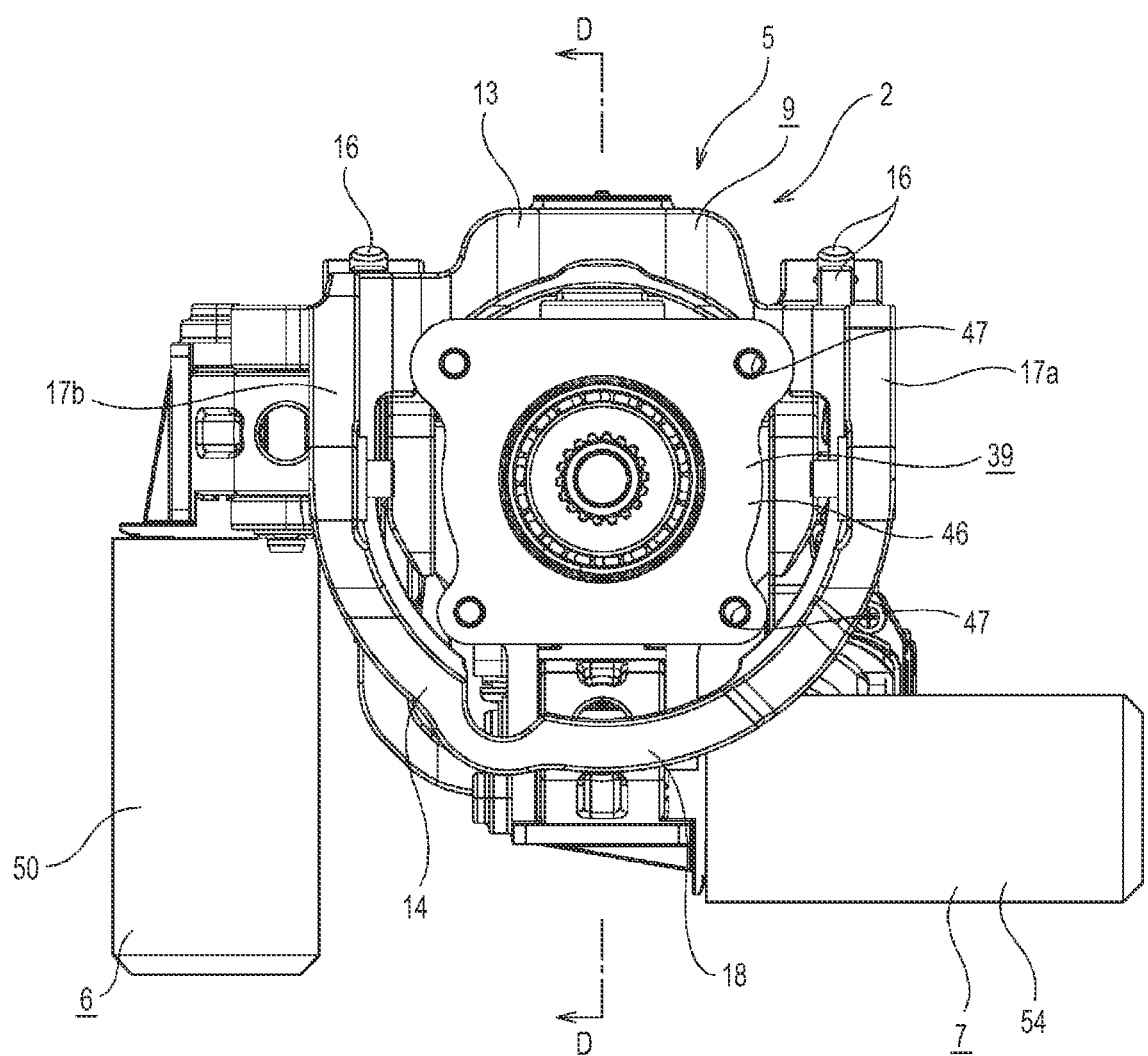
FIG. 6 is an end view as viewed from the left side of FIG. 5.

A first example of an embodiment of the present invention will be described with reference to FIGS. 1 to 16. The present example is an example in which a steering column device of the present invention is incorporated in a steering device in a steer-by-wire steering system. In a steer-by-wire steering system 67, a steering device 1 including a steering wheel 68 and a sensor (not shown) for measuring a steering amount of the steering wheel 68, and a wheel turning device 70 for applying a turning angle to a pair of steered wheels 69 are electrically connected to each other. That is, in the steer-by-wire steering system 67, an amount of operation that a driver performs on the steering wheel 68 is measured by the sensor of the steering device 1. Then, based on an output signal of the sensor, an actuator 71 of the wheel turning device 70 is driven to displace, in a width direction of a vehicle, a linear motion shaft such as a rack shaft or a screw shaft arranged in the width direction of the vehicle, and a pair of tie rods 72 are pushed and pulled to apply a turning angle to the pair of steered wheels 69.

The steering device 1 of the present example includes a steering column device 2, a steering shaft 3, and a reaction force applying device 4. A front-rear direction, an upper-lower direction, and a width direction of the steering device 1 refer to a front-rear direction, an upper-lower direction, and a width direction of the vehicle in a state in which the steering device 1 is attached to the vehicle.

The steering column device 2 includes a steering column 5, a lower telescopic actuator 6, an upper telescopic actuator 7, and a tilt actuator 8.

The steering column 5 includes a fixing bracket 9, a column holder 10, an upper column 11, and a linear guide 12, and is configured to extend and contract over an entire length. Specifically, in the steering column 5, the fixing bracket 9 and the column holder 10 are assembled via the linear guide 12 in a manner of being displaceable relative to each other in an axial direction, and the column holder 10 and the upper column 11 are assembled in a manner of being displaceable relative to each other in the axial direction.

The fixing bracket 9 includes a fixing plate portion 13 and a fixing-side bracket portion 14.

Figure 7:
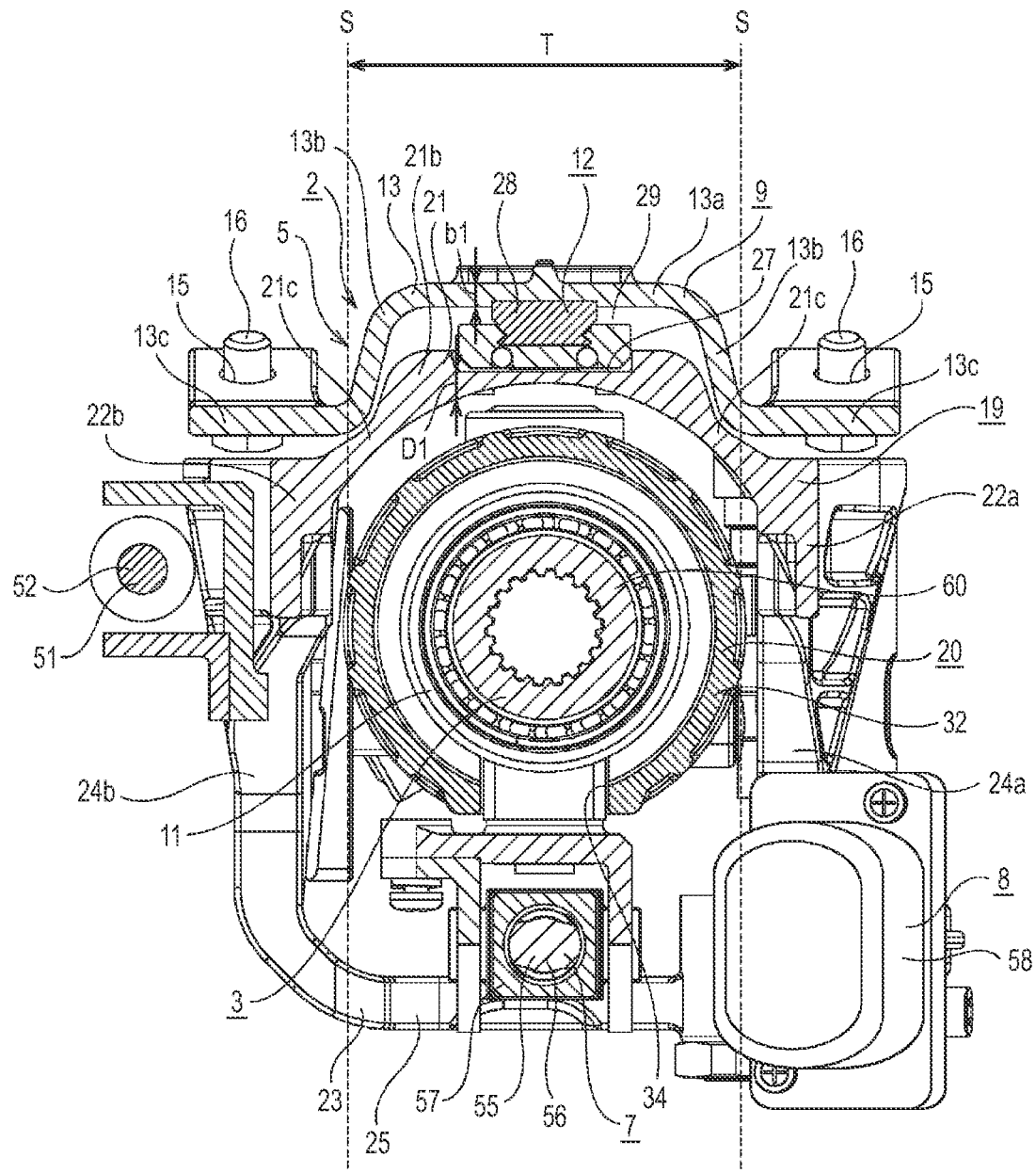
FIG. 7 is a cross-sectional view taken along a line A-A of FIG. 5.
Figure 8:
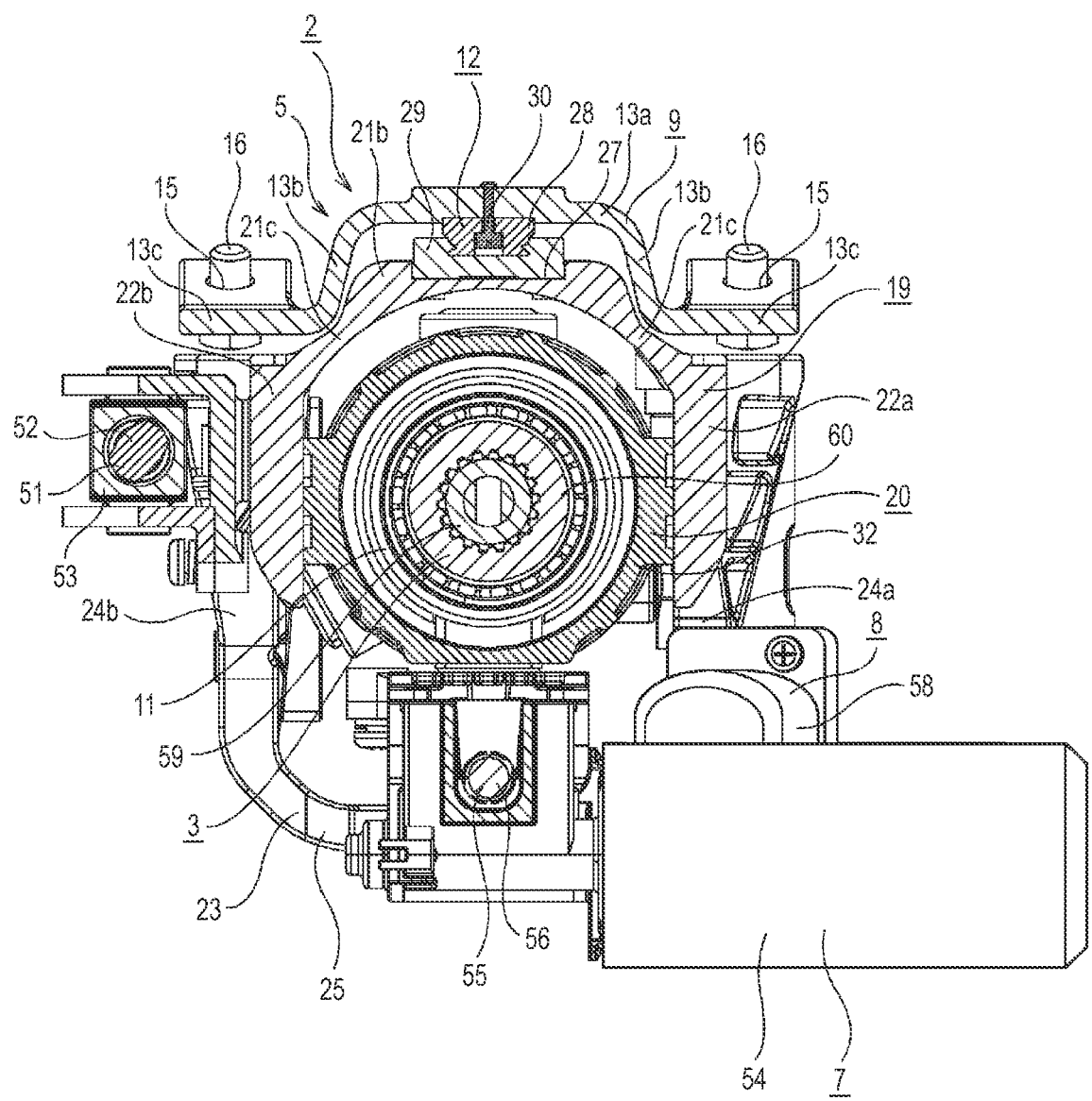
FIG. 8 is a cross-sectional view taken along a line B-B of FIG. 5.
Figure 9:
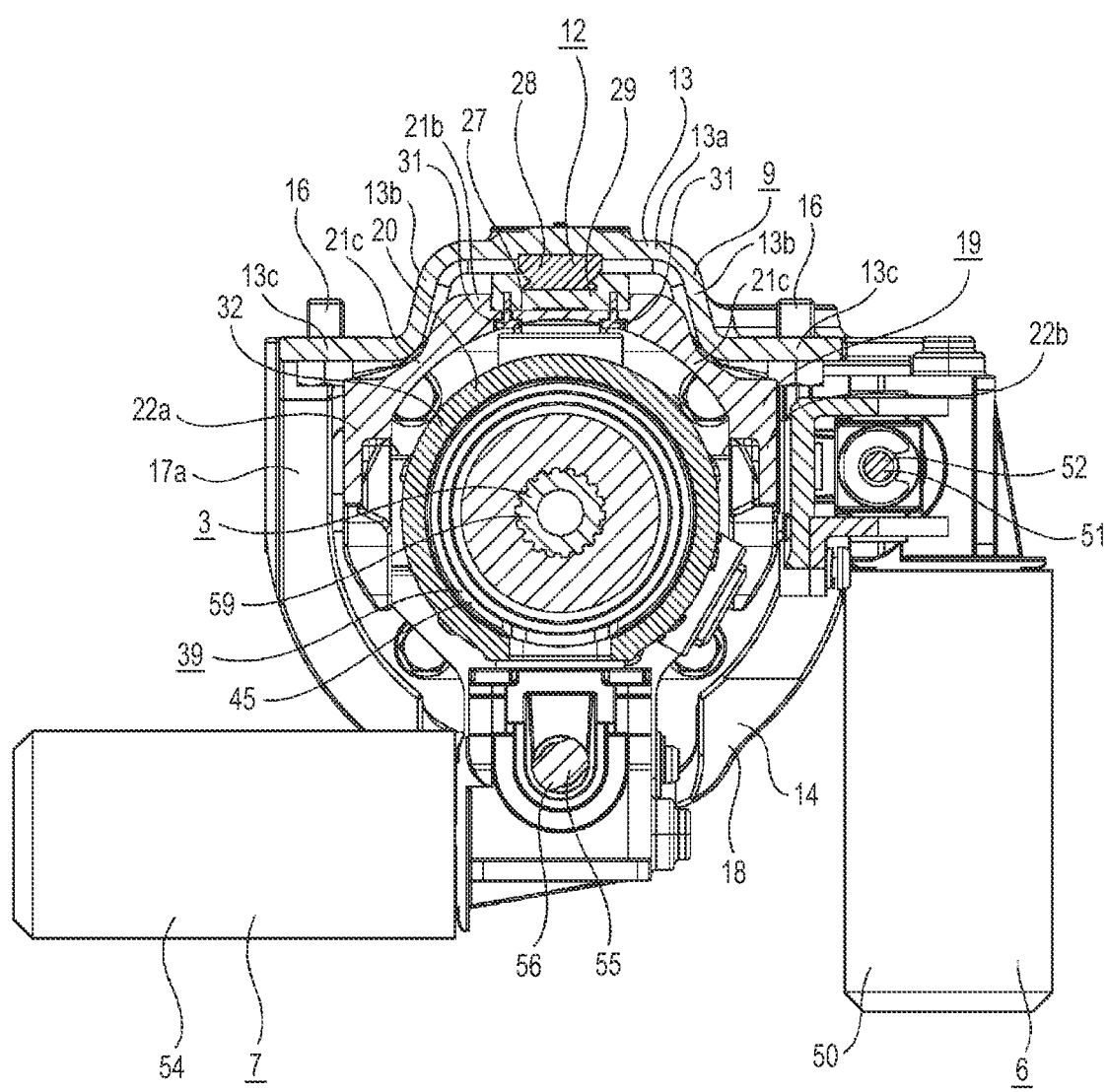
FIG. 9 is a cross-sectional view taken along a line C-C of FIG. 5.
Figure 10:
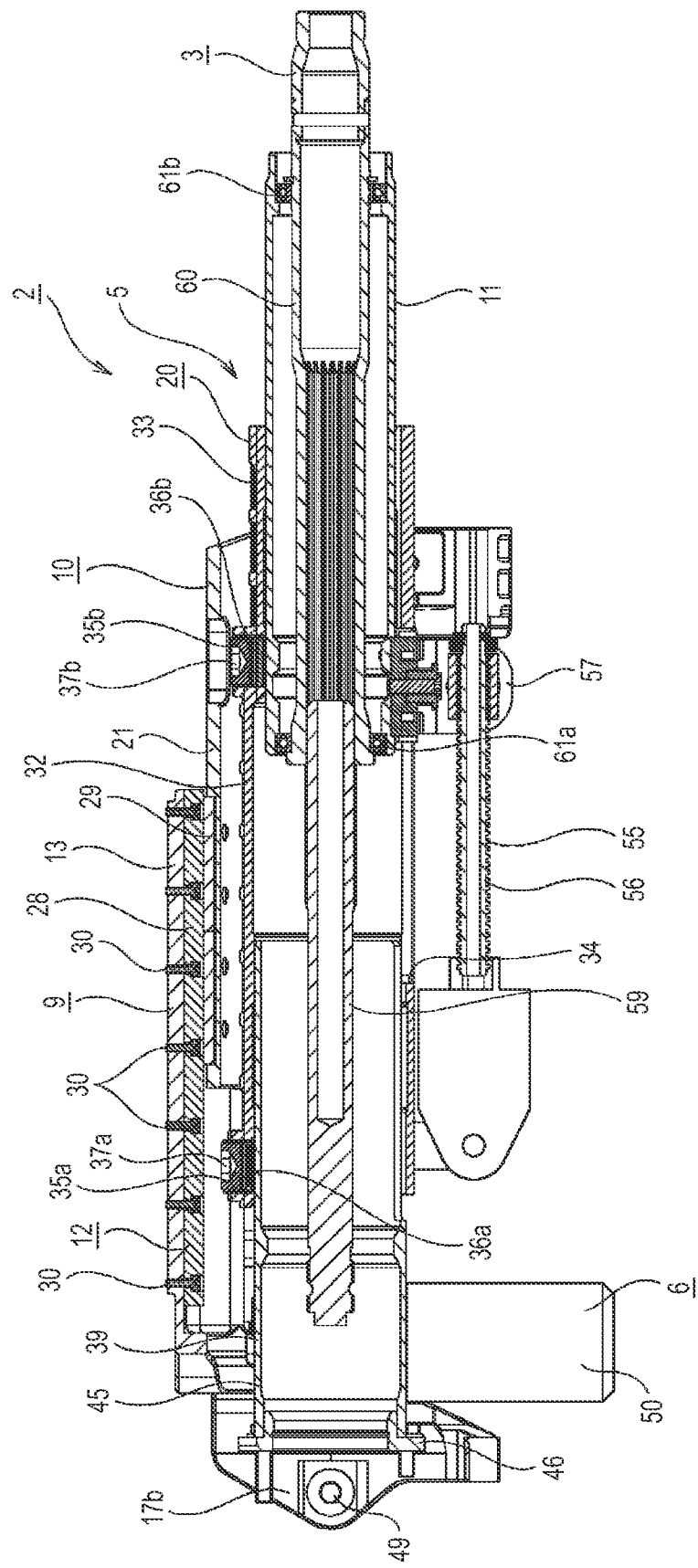
FIG. 10 is a cross-sectional view taken along a line D-D of FIG. 6.
Figure 11A:
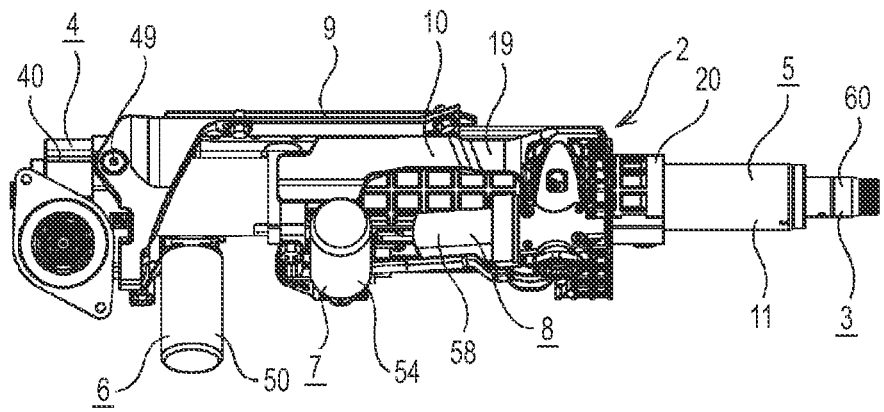
Figure 11B:
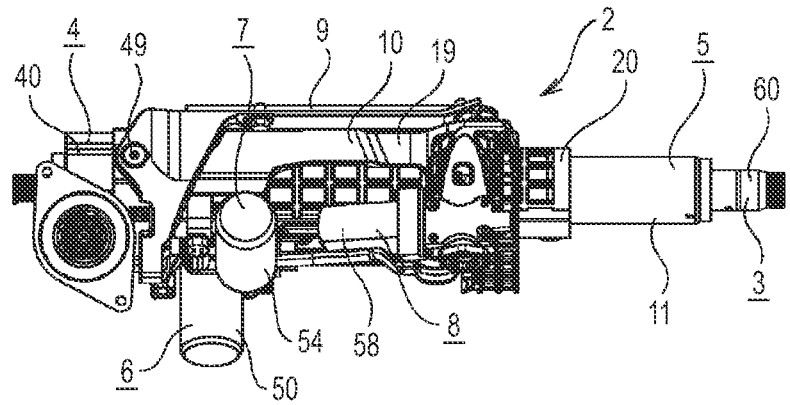
Figure 11C:
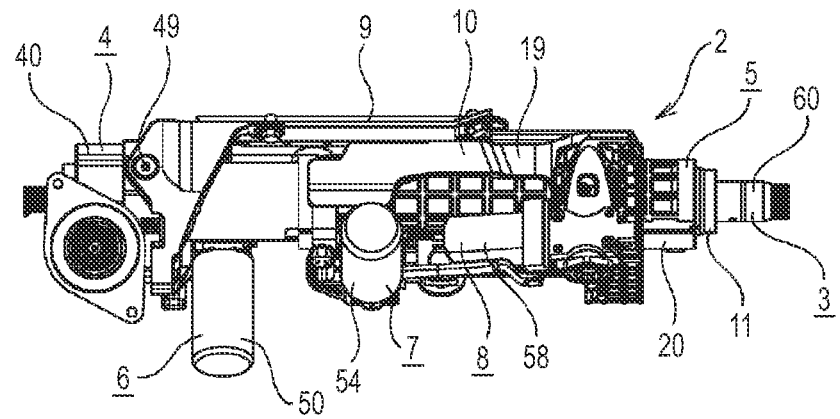
Figure 11D:
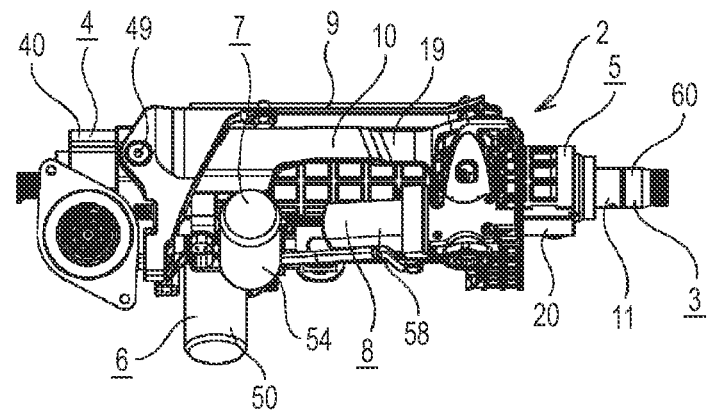
Figure 12:
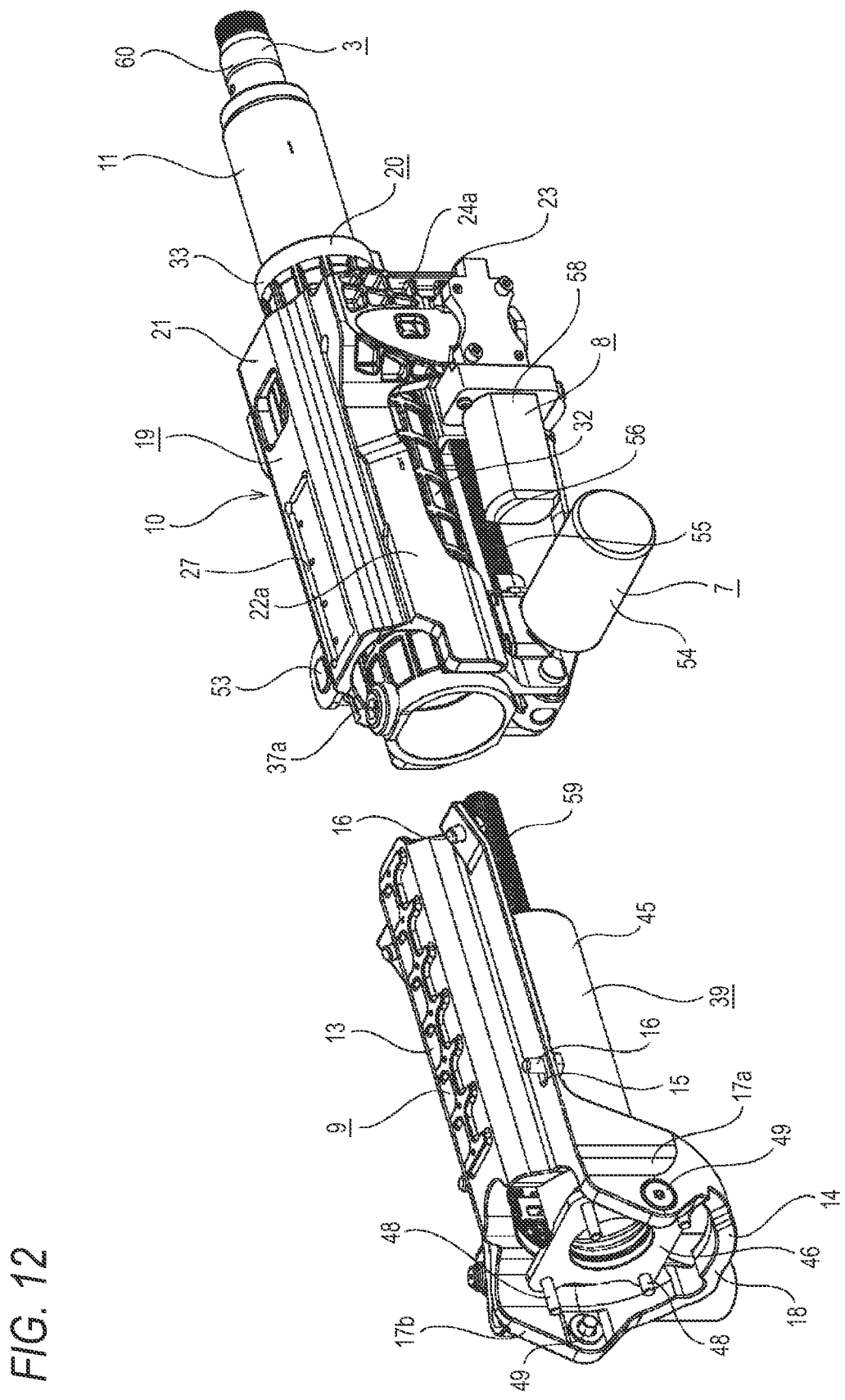
FIG. 12 is an exploded perspective view of a steering column device according to the first example of the embodiment of the present invention.
Figure 13:
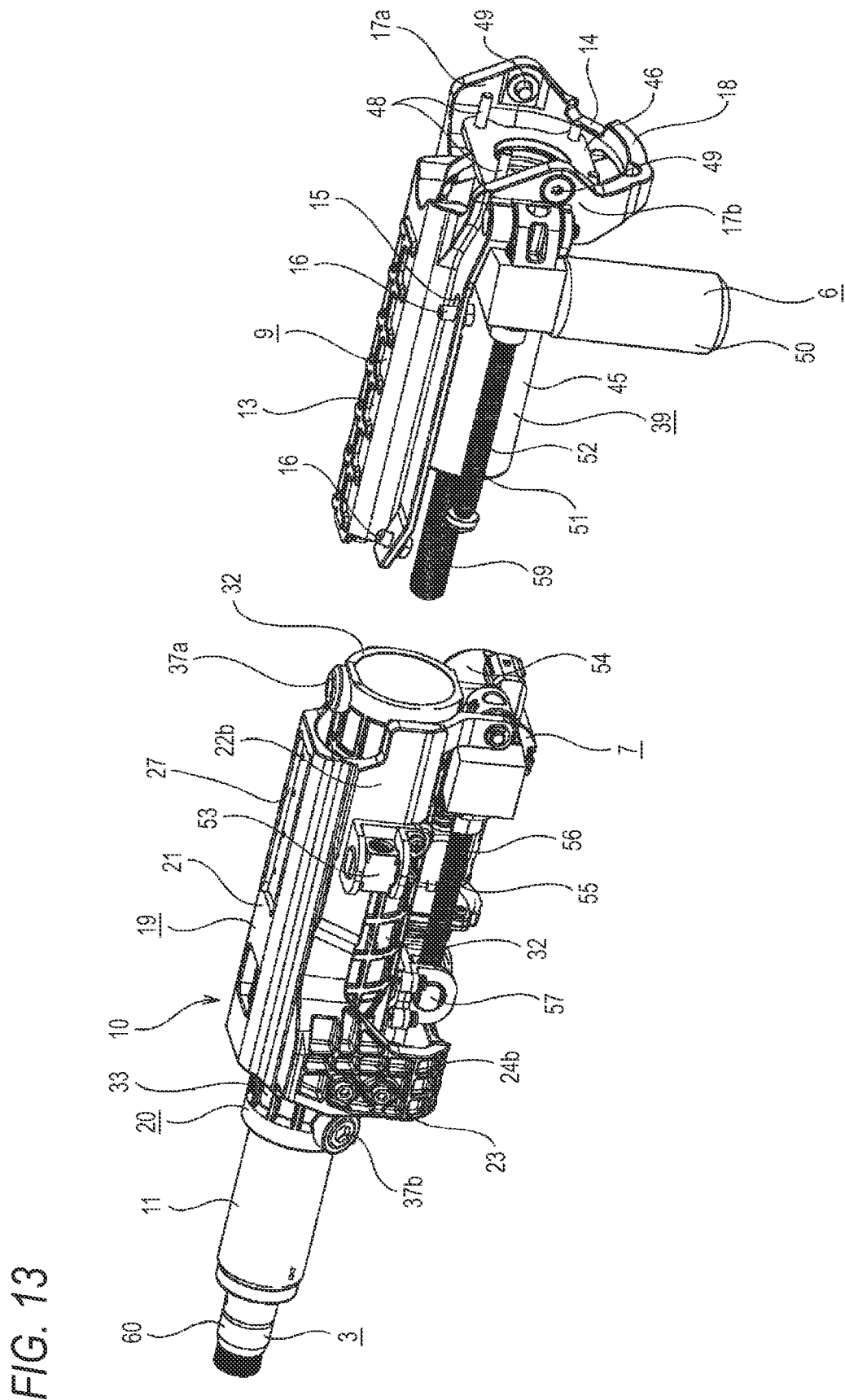
FIG. 13 is an exploded perspective view of the steering column device according to the first example of the embodiment of the present invention as viewed from a side opposite to that in FIG. 12 in a width direction.
Figure 14:
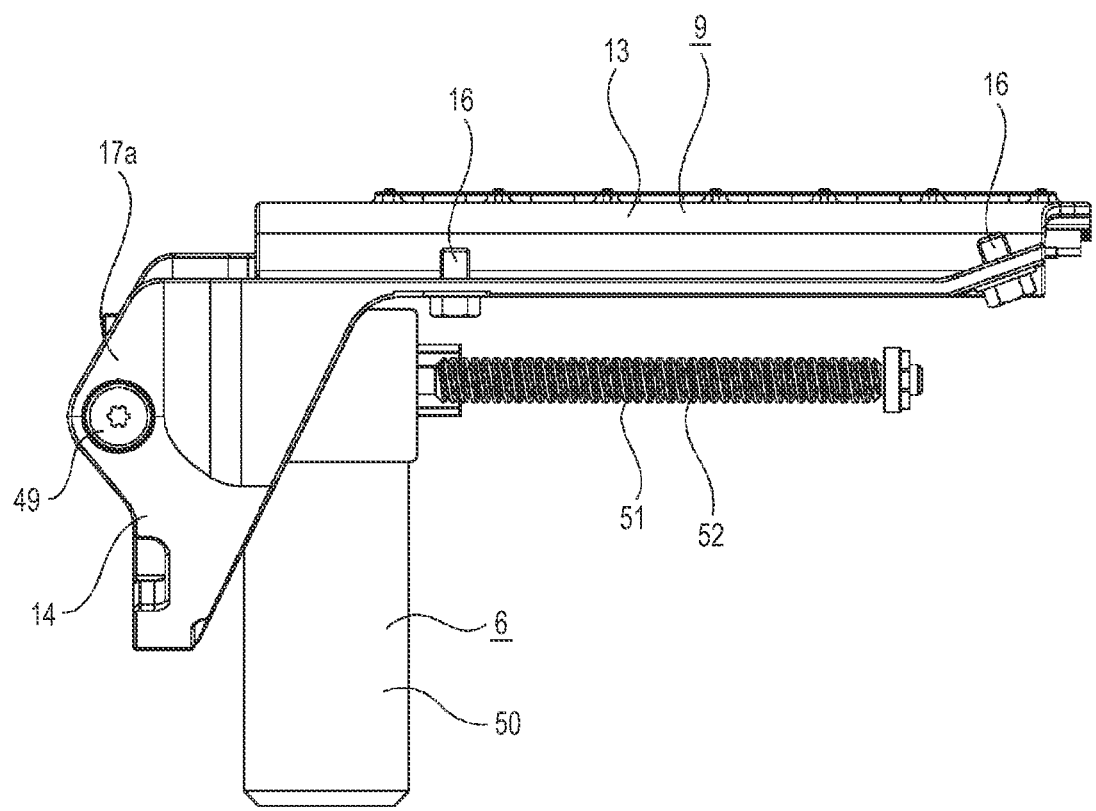
FIG. 14 is a side view showing the fixing bracket and a lower telescopic actuator taken out from the steering column device according to the first example of the embodiment of the present invention.

The fixing plate portion 13 has a rectangular shape extending in the front-rear direction when viewed in the upper-lower direction, and has through holes 15, each of which penetrates in the upper-lower direction, at two locations in the front-rear direction of each of both side portions in the width direction. The fixing bracket 9 is supported and fixed to a vehicle body (not shown) by mounting bolts 16 inserted into the through holes 15 of the fixing plate portion 13 from below. Further, as shown in FIGS. 7 to 9, the fixing plate portion 13 includes a base portion 13a disposed at an intermediate portion in the width direction, a pair of bent portions 13b bent downward from both end portions in the width direction of the base portion 13a, and flange portions 13c extending outward in the width direction from lower ends of the pair of bent portions 13b, in a cross-sectional view as viewed from the front-rear direction. The bent portion 13b is inclined outward in the width direction toward a lower side. The through holes 15 are formed in the flange portions 13c.

The fixing-side bracket portion 14 has a substantially U-shape when viewed in the front-rear direction, and is fixed to a front end portion of the fixing plate portion 13. That is, the fixing-side bracket portion 14 includes a pair of fixing-side side plate portions 17a, 17b hanging downward from both end portions in the width direction of the front end portion of the fixing plate portion 13, and a fixing-side connecting portion 18 connecting lower end portions of the fixing-side side plate portions 17a, 17b. In other words, the fixing-side connecting portion 18 extends between the lower end portions of the pair of fixing-side side plate portions 17a, 17b.

The column holder 10 includes a displacement bracket 19 supported by the fixing bracket 9 in a manner of being displaceable relative to the fixing bracket 9 in the axial direction (front-rear direction), and a lower column 20 supported by the displacement bracket 19 in a manner of being swingable in the upper-lower direction relative to the displacement bracket 19.

The displacement bracket 19 includes a displacement plate portion 21, a pair of hanging plate portions 22a, 22b, and a swing support bracket portion 23.

The displacement plate portion 21 has a rectangular shape extending in the front-rear direction when viewed in the upper-lower direction, and has a recessed portion 27 on an upper surface of a front portion thereof. Further, as shown in FIGS. 7 to 9, the displacement plate portion 21 includes a thick portion 21b disposed at an intermediate portion in the width direction and thin portions 21c connected to both sides of the thick portion 21b in the width direction and having a thickness smaller than that of the thick portion 21b, in a cross-sectional view as viewed from the front-rear direction. The thick portion 21b faces the base portion 13a of the fixing plate portion 13 with a gap therebetween in the upper-lower direction. The recessed portion 27 is formed on an upper surface of a front portion of the thick portion 21b. As will be described later, the linear guide 12 is disposed in the recessed portion 27. The thin portion 21c faces a corner portion, which is a connection portion between the bent portion 13b of the fixing plate portion 13 and the flange portion 13c, with a slight gap therebetween.

The pair of hanging plate portions 22a, 22b hang downward from end portions on both sides in the width direction from a front portion to an intermediate portion of the displacement plate portion 21.

The swing support bracket portion 23 has a substantially U-shape when viewed in the front-rear direction, and is fixed to a rear end portion of the displacement plate portion 21. That is, the swing support bracket portion 23 includes a pair of displacement-side side plate portions 24a, 24b hanging downward from both end portions in the width direction of the rear end portion of the displacement plate portion 21, and a displacement-side connecting portion 25 connecting lower end portions of the pair of displacement-side side plate portions 24a, 24b. In the pair of displacement-side side plate portions 24a, 24b, the displacement-side side plate portion 24a on one side in the width direction (right side in FIGS. 6 to 8, left side in FIG. 9) has a recessed groove 26 (see FIG. 16), which extends in the upper-lower direction, in an inner surface in the width direction. The displacement-side connecting portion 25 has a circular hole, which penetrates in the upper-lower direction, in a portion on the one side in the width direction.

The displacement bracket 19 is supported by the linear guide 12 in a manner of being displaceable relative to the fixing bracket 9 in the axial direction. That is, in the present example, the fixing bracket 9 constitutes a first column member, and the displacement bracket 19 constitutes a second column member. The linear guide 12 serving as a low-friction sliding member having a small friction coefficient and good sliding characteristics is disposed between the fixing bracket 9 and the displacement bracket 19.

The linear guide 12 includes a guide rail 28 having a rectangular shape extending in the axial direction (front-rear direction), and two sliders 29 each of which has a substantially U shape when viewed from the axial direction and which are assembled to the guide rail 28 in a manner of being displaceable in the axial direction along the guide rail 28. In the present example, the guide rail 28 is connected and fixed to a lower surface of the base portion 13a of the fixing plate portion 13 of the fixing bracket 9 by a plurality of support bolts 30. Each of the sliders 29 is connected and fixed to an inside of the recessed portion 27 of the thick portion 21b of the displacement bracket 19 by a plurality of support bolts 31. That is, the displacement bracket 19 has through holes 63, each of which penetrates the displacement plate portion 21 in the upper-lower direction, at a plurality of axial locations on each of two sides in the width direction sandwiching a central axis of the steering column 5 in the displacement plate portion 21. An upper end portion of each of the through holes 63 is opened to a bottom surface of the recessed portion 27. In addition, each of the sliders 29 has screw holes 64 at two locations separated from each other in the axial direction in each of both side portions in the width direction of a lower surface of the corresponding slider 29. Each of the sliders 29 is supported and fixed to the inside of the recessed portion 27 of the thick portion 21b of the displacement bracket 19 by screwing the support bolts 31 inserted into the through holes 63 from below into the screw holes 64. Thus, the displacement bracket 19 is supported in a manner of being displaceable relative to the fixing bracket 9 in the axial direction.

Here, the linear guide 12 is preferably disposed inward of the outer peripheral surface of the lower column 20 in the width direction. In FIG. 7, a pair of virtual planes S that are in contact with both end portions in the width direction of the outer peripheral surface of the lower column 20 and extend in the upper-lower direction are indicated by broken lines. Then, the linear guide 12 is disposed in a region T sandwiched between the pair of virtual planes S in the width direction. Therefore, the steering column device 2 can be made compact in the width direction as compared with a case where the low-friction sliding member such as the linear guide 12 is disposed outward of the outer peripheral surface of the lower column 20 in the width direction.

Further, as described above, since the linear guide 12 is disposed in the thick portion 21b of the displacement plate portion 21 of the displacement bracket 19, sufficient rigidity can be secured.

Further, similarly to the linear guide 12, the thick portion 21b of the displacement plate portion 21 is also preferably disposed inward of the outer peripheral surface of the lower column 20 in the width direction. That is, the thick portion 21b of the displacement plate portion 21 is disposed in the region T sandwiched between the pair of virtual planes S in the width direction. Therefore, the steering column device 2 can be made compact in the width direction as compared with a case where the thick portion 21b of the displacement plate portion 21 is disposed outward of the outer peripheral surface of the lower column 20 in the width direction.

Further, in a portion adjacent to a location at which the linear guide 12 is disposed, a thickness of the thick portion 21b of the displacement plate portion 21 of the displacement bracket 19 is set to be larger than a thickness of the base portion 13a of the fixing bracket 9. More specifically, in a direction (upper-lower direction) perpendicular to a sliding direction (front-rear direction) of the linear guide 12 and a direction (width direction) in which the displacement of the linear guide 12 is restricted by the recessed portion 27 of the displacement plate portion 21, a thickness D1 of a portion of the thick portion 21b adjacent to the location at which the linear guide 12 is disposed (recessed portion 27) is set to be larger than a thickness d1 of a portion of the base portion 13a adjacent to the location at which the linear guide 12 is disposed. Accordingly, the steering column device 2 is made compact in the width direction, and the rigidity of the steering column device 2 can be ensured.

As the linear guide 12, any one of a sliding type linear guide, a ball circulation type linear guide, and a non-circulation roller type linear guide may be used. In the sliding type linear guide, an engaging projection portion formed on the slider is engaged with a rail groove formed on the guide rail. In the ball circulation type linear guide, a plurality of balls are rollably disposed in a load path provided between a guide rail and a slider, and a circulation path is provided inside the slider to return the balls which are moved to an end point of the load path along with relative displacement between the guide rail and the slider to a start point of the load path. In the non-circulation roller type linear guide, a plurality of rollers rollably supported by a slider are brought into rolling contact with a rolling surface formed on a guide rail.

Figure 15:
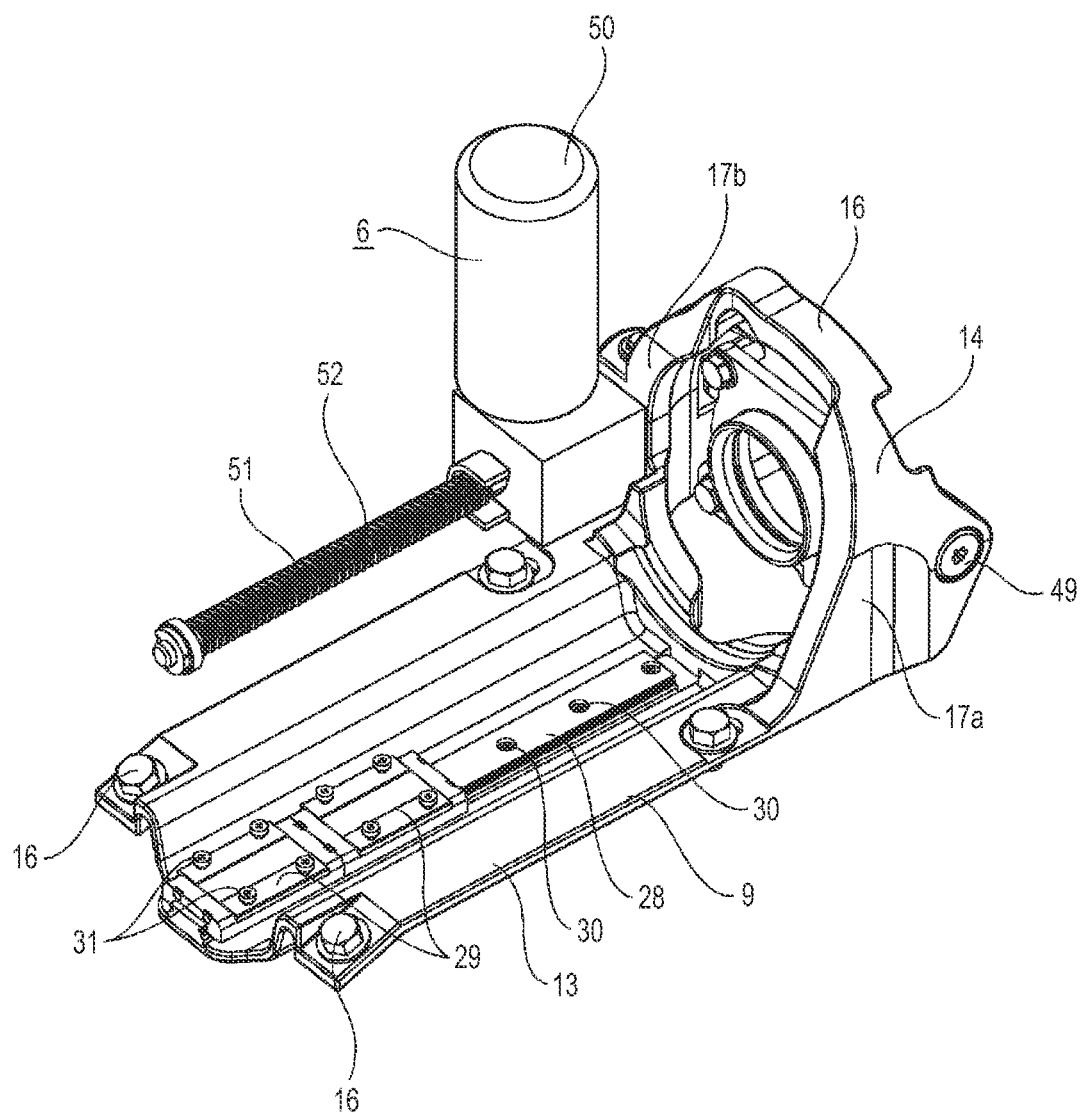
FIG. 15 is a perspective view showing the fixing bracket and the lower telescopic actuator taken out from the steering column device according to the first example of the embodiment of the present invention.
Figure 16:
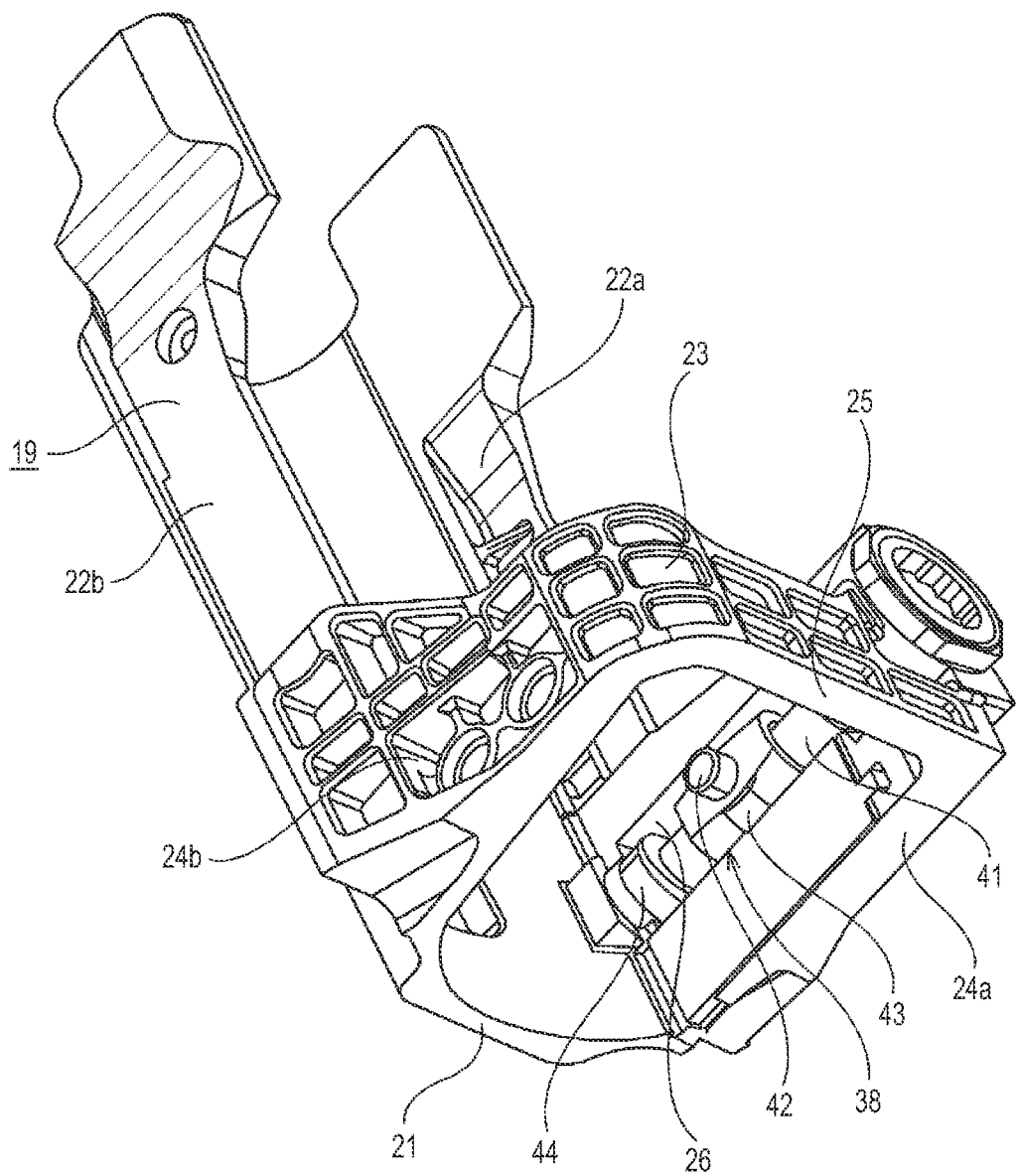
FIG. 16 is a perspective view showing a displacement bracket taken out from the steering column device according to the first example of the embodiment of the present invention.

The shown linear guide 12 includes two sliders 29 (see FIG. 15). However, at the time of implementing the present invention, the number of sliders of the linear guide may be one or three or more.

The lower column 20 has a substantially cylindrical shape, and is supported in a manner of being swingable in the upper-lower direction relative to the displacement bracket 19. The lower column 20 has a large diameter portion 32 at a front portion thereof, and a small diameter portion 33 having an inner diameter smaller than that of the large diameter portion 32 at a rear portion thereof. Further, the lower column 20 has a slit 34 extending in the axial direction in a lower surface of an axially intermediate portion (a portion from a rear portion of the large diameter portion 32 to a front end portion of the small diameter portion 33), and has screw holes 35a, 35b on respective upper surfaces of a front end portion of the large diameter portion 32 and the front end portion of the small diameter portion 33. Screw plugs 37a, 37b, to whose tip end portions pads 36a, 36b each being made of a material having a small friction coefficient such as polyacetal (POM) are adhesively fixed, are screwed into the screw holes 35a, 35b, respectively.

In the present example, a rear portion of the lower column 20 is supported in a manner of being displaceable in the upper-lower direction relative to the swing support bracket portion 23 of the displacement bracket 19 via a tilt feed screw device 38 (see FIG. 16) constituting the tilt actuator 8. A front portion of the lower column 20 is pivotally supported, via an inner column 39 and a housing 40 of the reaction force applying device 4, by the fixing-side bracket portion 14 of the fixing bracket 9 supported by the vehicle body.

The tilt feed screw device 38 includes a screw shaft 41 having a male screw portion on an outer peripheral surface thereof, and a nut 43 having a female screw portion screwed with the male screw portion on an inner peripheral surface thereof and having a columnar pivot shaft portion 42 on an outer peripheral surface thereof. In the present example, the screw shaft 41 is rotatably supported inside the recessed groove 26 of the displacement-side side plate portion 24a on the one side in the width direction of the swing support bracket portion 23 and the circular hole formed in the displacement-side connecting portion 25 via a bearing device 44 such as a radial rolling bearing and/or a sliding bearing, and the pivot shaft portion 42 of the nut 43 is rotatably supported (pivotally supported) by a pivot support recessed portion formed on an outer peripheral surface of the rear portion (the small diameter portion 33) of the lower column 20. Therefore, when the nut 43 is displaced in the axial direction (upper-lower direction) of the screw shaft 41 along the screw shaft 41 as the screw shaft 41 rotates, the rear portion of the lower column 20 is displaced in the upper-lower direction with respect to the swing support bracket portion 23 of the displacement bracket 19.

The inner column 39 includes a cylindrical portion 45 and a flange portion 46 that is bent radially outward from a front end portion of the cylindrical portion 45. The inner column 39 is assembled to the lower column 20 in a manner of being displaceable relative to the lower column 20 in the axial direction of the lower column 20. Specifically, a rear portion of the cylindrical portion 45 is internally fitted into the large diameter portion 32 of the lower column 20 with a clearance fit, and the pad 36a of the screw plug 37a screwed into the screw hole 35a on a front side of the lower column 20 abuts against an outer peripheral surface of the rear portion of the cylindrical portion 45. Thus, the inner column 39 is internally fitted into the lower column 20 in a manner of being displaceable relative to the lower column 20 in the axial direction of the lower column 20.

Since the screw plug 37a is not in direct contact with the outer peripheral surface of the cylindrical portion 45 and the pad 36a provided at the tip end portion of the screw plug 37a is in contact with the outer peripheral surface of the cylindrical portion 45, it is easy to adjust an abutting force. Further, the abutting force can also be easily adjusted by adjusting a tightening torque of the screw plug 37a. In this way, a sliding frictional force between the pad 36a and the outer peripheral surface of the cylindrical portion 45 when the inner column 39 and the lower column 20 are relatively displaced in the axial direction can be adjusted. An elastic member such as a spring may be used to adjust the abutting force of the pad 36a against the cylindrical portion 45. In the shown example, one screw hole 35a is formed on the front side of the lower column 20, and the screw plug 37a including the pad 36a is screwed into the one screw hole 35a, but a plurality of screw holes 35a may be provided, and the screw plug 37a including the pad 36a may be screwed into each of the plurality of screw holes 35a.

The housing 40 of the reaction force applying device 4 is supported and fixed to the inner column 39 by fixing bolts 48 inserted from rear into through holes 47 formed in the flange portion 46 of the inner column 39. Further, the housing 40 is pivotally supported with respect to the fixing bracket 9 by pivot bolts 49 inserted into through holes formed in the fixing-side side plate portions 17a, 17b of the fixing-side bracket portion 14.

Therefore, when the nut 43 is displaced in the upper-lower direction as the screw shaft 41 rotates and the rear portion of the lower column 20 is displaced in the upper-lower direction with respect to the swing support bracket portion 23 of the displacement bracket 19, the lower column 20 swings in the upper-lower direction around the pivot bolts 49.

The upper column 11 has a substantially cylindrical shape and is assembled to the column holder 10 in a manner of being displaceable relative to the column holder 10 in the axial direction. Specifically, a front portion of the upper column 11 is internally fitted into the small diameter portion 33 of the lower column 20 with a clearance fit, and the pad 36b of the screw plug 37b screwed into the screw hole 35b on a rear side of the lower column 20 abuts against an outer peripheral surface of the front portion of the upper column 11. Thus, the upper column 11 is internally fitted into the lower column 20 in a manner of being displaceable relative to the lower column 20 in the axial direction of the lower column 20.

Since the screw plug 37b is not in direct contact with the outer peripheral surface of the upper column 11 and the pad 36b provided at the tip end portion of the screw plug 37b is in contact with the outer peripheral surface of the upper column 11, it is easy to adjust an abutting force. Further, the abutting force can also be easily adjusted by adjusting a tightening torque of the screw plug 37b. In this way, a sliding frictional force between the pad 36b and the outer peripheral surface of the upper column 11 when the upper column 11 and the lower column 20 are relatively displaced in the axial direction can be adjusted. An elastic member such as a spring may be used to adjust the abutting force of the pad 36b against the outer peripheral surface of the upper column 11. In the shown example, one screw hole 35b is formed on the rear side of the lower column 20, and the screw plug 37b including the pad 36b is screwed into the one screw hole 35b, but a plurality of screw holes 35b may be provided, and the screw plug 37b including the pad 36b may be screwed into each of the plurality of screw holes 35b.

The lower telescopic actuator 6 includes a lower telescopic motor 50, and displaces the column holder 10 in the axial direction with respect to the fixing bracket 9 by using the lower telescopic motor 50 as a drive source. In the present example, the lower telescopic actuator 6 constitutes a telescopic actuator, and the lower telescopic motor 50 constitutes a telescopic motor. The lower telescopic actuator 6 further includes a lower feed screw device 51 for converting rotational motion of an output shaft of the lower telescopic motor 50 into linear motion.

The lower feed screw device 51 includes a screw shaft 52 having a male screw portion on an outer peripheral surface thereof and rotationally driven by the lower telescopic motor 50, and a nut 53 having a female screw portion, that is screwed to the male screw portion, on an inner peripheral surface thereof.

In the present example, the screw shaft 52 is supported to be only rotatable with respect to the fixing bracket 9, and the nut 53 is supported and fixed to the displacement bracket 19 of the column holder 10. Specifically, the screw shaft 52 is fixed to be only rotatable with respect to an outer surface in the width direction (the other side surface in the width direction) of the fixing-side side plate portion 17b on the other side in the width direction (left side in FIGS. 6 to 8, right side in FIG. 9) of the fixing-side bracket portion 14 constituting the fixing bracket 9, and the nut 53 is supported and fixed to an outer surface in the width direction of the hanging plate portion 22b on the other side in the width direction of the displacement bracket 19. Further, the lower telescopic motor 50 is supported and fixed to the fixing-side bracket portion 14. Therefore, when the nut 53 is displaced in the front-rear direction along the screw shaft 52 as the screw shaft 52 is rotationally driven by the lower telescopic motor 50 via a speed reduction mechanism such as a worm speed reducer, the displacement bracket 19 is displaced relative to the fixing bracket 9 in the axial direction of the fixing bracket 9, that is, in the front-rear direction.

The upper telescopic actuator 7 includes an upper telescopic motor 54, and displaces the upper column 11 in the axial direction with respect to the column holder 10 by using the upper telescopic motor 54 as a drive source. In the present example, the upper telescopic actuator 7 further includes an upper feed screw device 55 for converting rotational motion of an output shaft of the upper telescopic motor 54 into linear motion.

The upper feed screw device 55 includes a screw shaft 56 having a male screw portion on an outer peripheral surface thereof and rotationally driven by the upper telescopic motor 54, and a nut 57 having a female screw portion, that is screwed to the male screw portion, on an inner peripheral surface thereof.

In the present example, the screw shaft 56 is supported to be only rotatable with respect to the lower column 20 of the column holder 10, and the nut 57 is supported and fixed to the upper column 11. Specifically, the screw shaft 56 is supported to be rotatable only with respect to a lower surface of the front portion of the large diameter portion 32 of the lower column 20, and the nut 57 is supported and fixed to a lower surface of the front portion of the upper column 11. Further, the upper telescopic motor 54 is supported and fixed to the lower column 20. Therefore, when the nut 57 is displaced in the front-rear direction along the screw shaft 56 as the screw shaft 56 is rotationally driven by the upper telescopic motor 54 via a speed reduction mechanism such as a worm speed reducer, the upper column 11 is displaced relative to the lower column 20 in the axial direction of the lower column 20, that is, in the front-rear direction.

The tilt actuator 8 includes a tilt motor 58 and a tilt feed screw device 38. In the tilt actuator 8, the screw shaft 41 of the tilt feed screw device 38 is rotationally driven by the tilt motor 58 via a speed reduction mechanism such as a worm speed reducer, the nut 43 is moved in the upper-lower direction along the screw shaft 41, and thus the rear portion of the lower column 20 is displaced in the upper-lower direction with respect to the displacement bracket 19.

The steering shaft 3 is formed by assembling an inner shaft 59 and an outer shaft 60 such that the inner shaft 59 and the outer shaft 60 can be relatively displaced in the axial direction and cannot be relatively rotated. In the present example, the steering shaft 3 is formed by spline-engaging a rear portion of the inner shaft 59 on the front side with a front portion of the outer shaft 60 on the rear side.

The steering shaft 3 is rotatably supported on a radially inner side of the steering column 5 of the steering column device 2. Specifically, a front end portion of the outer shaft 60 is rotatably supported in the front end portion of the upper column 11 by a radial rolling bearing 61a, and a rear portion of the outer shaft 60 is rotatably supported in the rear end portion of the upper column 11 by a radial rolling bearing 61b. Therefore, the steering shaft 3 extends and contracts together with the steering column 5.

A steering wheel 68 is supported by a rear end portion of the steering shaft 3, that is, a rear end portion of the outer shaft 60. Further, the reaction force applying device 4 for applying an operation reaction force to the steering wheel 68 is connected to a front end portion of the steering shaft 3, that is, a front end portion of the inner shaft 59.

The reaction force applying device 4 includes the housing 40, a reaction force applying motor (not shown), and a speed reducer. When the steering wheel 68 is operated by the driver, the reaction force applying device 4 drives the reaction force applying motor, increases a torque of the reaction force applying motor by the speed reducer housed inside the housing 40, and then applies the torque to the steering shaft 3. Thus, an operation reaction force is applied to the steering wheel 68. A magnitude of the reaction force applied to the steering wheel 68 is determined according to a steering angle of the steering wheel 68 acquired by the sensor, the torque applied to the steering shaft 3, and the like. The speed reducer is, for example, a worm speed reducer.

In the steering device 1 of the present example, at the time of adjusting a front-rear position of the steering wheel 68, the column holder 10 (displacement bracket 19) is displaced in the axial direction (front-rear direction) relative to the fixing bracket 9 based on energization of the lower telescopic motor 50, and/or the upper column 11 is displaced in the axial direction (front-rear direction) relative to the column holder 10 (lower column 20) based on energization of the upper telescopic motor 54.

That is, when the lower telescopic motor 50 is energized, and the screw shaft 52 of the lower feed screw device 51 is rotationally driven by the lower telescopic motor 50 to displace the nut 53 in the front-rear direction, the displacement bracket 19 is displaced relative to the fixing bracket 9 in the axial direction of the fixing bracket 9, that is, in the front-rear direction. Alternatively/further, when the upper telescopic motor 54 is energized, and the screw shaft 56 of the upper feed screw device 55 is rotationally driven by the upper telescopic motor 54 to displace the nut 57 in the front-rear direction, the upper column 11 is displaced relative to the lower column 20 in the axial direction of the lower column 20, that is, in the front-rear direction. Thus, the steering column 5 is extended and contracted over the entire length thereof, and the steering shaft 3 is extended and contracted over the entire length thereof, thereby adjusting the front-rear position of the steering wheel 68. After the front-rear position of the steering wheel 68 is adjusted to a desired position, energization of the lower telescopic motor 50 and/or the upper telescopic motor 54 is stopped.

At the time of adjusting an upper-lower position of the steering wheel 68, the rear portion of the lower column 20 is displaced relative to the displacement bracket 19 in the upper-lower direction based on energization of the tilt motor 58. That is, when the tilt motor 58 is energized, and the screw shaft 41 of the tilt feed screw device 38 is rotationally driven by the tilt motor 58 to displace the nut 43 in the upper-lower direction, the rear portion of the lower column 20 is displaced in the upper-lower direction while the lower column 20 is swung around the pivot bolts 49. Thus, the rear end portion of the steering shaft 3, which is rotatably supported on the radially inner side of the steering column 5, is displaced in the upper-lower direction to adjust the upper-lower position of the steering wheel 68. After the upper-lower position of the steering wheel 68 is adjusted to a desired position, the energization of the tilt motor 58 is stopped.

The adjustment of the front-rear position of the steering wheel 68 and the adjustment of the upper-lower position of the steering wheel 68 may be performed at the same time, or may be performed independently (temporally).

In the present example, the steering column 5 is configured by assembling the fixing bracket 9 and the column holder 10 in a manner of being displaceable relative to each other in the axial direction, and assembling the column holder 10 and the upper column 11 in a manner of being displaceable relative to each other in the axial direction. That is, the steering column 5 has a two-stage telescopic structure. Therefore, axial dimensions of the screw shaft 52 of the lower feed screw device 51 and the screw shaft 56 of the upper feed screw device 55 can be prevented from becoming excessively large while sufficiently securing an amount of extension and contraction of the steering column 5 over the entire length.

The steering column device 2 of the present example is configured such that the column holder 10 is displaced in the axial direction with respect to the fixing bracket 9 by the lower telescopic actuator 6, and the upper column 11 is displaced in the axial direction with respect to the column holder 10 by the upper telescopic actuator 7. Therefore, even in a case where any one of the lower telescopic actuator 6 and the upper telescopic actuator 7 malfunctions or the like, the front-rear position of the steering wheel 68 can be adjusted by the other actuator.

Further, in the steering column device 2 of the present example, by energizing the lower telescopic motor 50 of the lower telescopic actuator 6 and the upper telescopic motor 54 of the upper telescopic actuator 7 at the same time, the upper column 11 can be displaced relative to the column holder 10 in the axial direction at the same time that the column holder 10 is being displaced relative to the fixing bracket 9 in the axial direction. Therefore, as compared with a structure in which the steering column is extended and contracted over the entire length thereof by one electric motor, the extension and contraction speed of the steering column 5 is easily increased.

In particular, in the steering column device 2 of the present example, the fixing bracket 9 and the column holder 10 (displacement bracket 19) are assembled via the linear guide 12 having high component accuracy and assembly accuracy. Therefore, it is possible to achieve both high-level compatibility between ensuring the support rigidity of the column holder 10 with respect to the fixing bracket 9 and reducing the resistance (displacement resistance) in the axial displacement of the column holder 10 relative to the fixing bracket 9. Further, by reducing the displacement resistance of the column holder 10, the lower telescopic actuator 6 for displacing the column holder 10 relative to the fixing bracket 9 in the axial direction can be reduced in size, and an operation noise when the column holder 10 is displaced relative to the fixing bracket 9 in the axial direction can be reduced.

Further, by assembling the fixing bracket 9 and the column holder 10 via the linear guide 12, the extension and contraction speed of the steering column 5 can also be increased. In particular, when an amount of adjustment in the front-rear position of the steering wheel 68 is large, such as when storing the steering wheel 68 inside the dashboard or when deploying the steering wheel 68 stored inside the dashboard, an effect of increasing the extension and contraction speed of the steering column 5 can be significantly obtained.

Further, since the fixing bracket 9 and the column holder 10 are assembled with each other via the linear guide 12, it is possible to sufficiently secure the rigidity against, when a driver gets on or off a vehicle, a downward force applied to the steering column 5 from the steering wheel 68 and left-right forces applied to the steering column 5 from the steering wheel 68 during curve traveling which are generated based on a fact that the driver puts his/her hand on the steering wheel 68.

In the steering device 1 of the present example, when adjusting the front-rear position of the steering wheel 68, for example, the front-rear position of the steering wheel 68 can be adjusted to a desired position by finely adjusting a displacement amount of the column holder 10 relative to the fixing bracket 9 in the axial direction and/or the displacement amount of the upper column 11 relative to the column holder 10 in the axial direction after the fixing bracket 9 is largely displaced relative to the column holder 10 in the axial direction at a high speed.

Further, in the present example, the guide rail 28 of the linear guide 12 is connected and fixed to the lower surface of the fixing plate portion 13 of the fixing bracket 9 by a plurality of support bolts 30, and the slider 29 is connected and fixed to the upper surface of the displacement plate portion 21 of the displacement bracket 19 by a plurality of support bolts 31. Since the linear guide 12 has high component accuracy and assembly accuracy, it is not necessary to adjust the resistance (displacement resistance) in the displacement of the column holder 10 in the axial direction relative to the fixing bracket 9 after the fixing bracket 9 and the column holder 10 are assembled via the linear guide 12. In short, according to the steering column device 2 of the present example, even when the steering column 5 has a two-stage telescopic structure, the structure can be simplified and the assembly cost can be kept low.

In particular, even in a case where a ball circulation type linear guide is used as the linear guide 12, since the component accuracy and the assembly accuracy are high and there is no rattling of the ball, it is not necessary to adjust a preload again after the fixing bracket 9 and the column holder 10 are assembled. In the steering column described in the US2019/210632 specification, it is necessary to assemble the jackets by fitting the jackets to each other while holding a plurality of balls between the jackets, and the assembly work may be complicated. Meanwhile, when a ball circulation type linear guide is used as the linear guide 12 of the present example, since the balls are assembled with the linear guide 12 in advance to form a unit, the assembly work can be facilitated.

In the present example, the linear guide 12 is disposed at an upper portion between the fixing bracket 9 and the displacement bracket 19, but when implementing the present invention, the linear guide can also be disposed at a lower portion between the fixing bracket and the displacement bracket. Alternatively, the linear guide may be disposed on each of both sides in the width direction between the fixing bracket and the displacement bracket. In this case, one linear guide is disposed on each of both sides in the width direction between the fixing bracket and the displacement bracket.

In the present example, the fixing bracket 9 and the column holder 10 (displacement bracket 19) are assembled via the linear guide 12, but alternatively or additionally, the column holder (lower column) and the upper column can also be assembled via a linear guide.

In the present example, a case has been described in which the present invention is applied to the steering column device 2 including both the telescopic mechanism for adjusting the front-rear position of the steering wheel 68 and the tilt mechanism for adjusting the upper-lower position, but the present invention can also be applied to a steering column device including only the telescopic mechanism. Further, in the present example, a case in which the steering column device of the present invention is applied to the steering device of a steer-by-wire steering system has been described, but the steering column device of the present invention is not limited thereto, and can also be applied to a mechanical steering system in which the front end portion of the steering shaft is mechanically connected to an input shaft (pinion shaft) of a steering gear unit via a universal joint or an intermediate shaft. The mechanical steering system can include an assist device for reducing a force required for the driver to operate the steering wheel. That is, the steering column device of the present invention can be applied to a power steering system such as an electric power steering system.

The steering column 5 of the present example has a two-stage telescopic structure, but the present invention can also be applied to a steering column device in which the steering column has a one-stage telescopic structure.

Second Example of Embodiment

Figure 17:
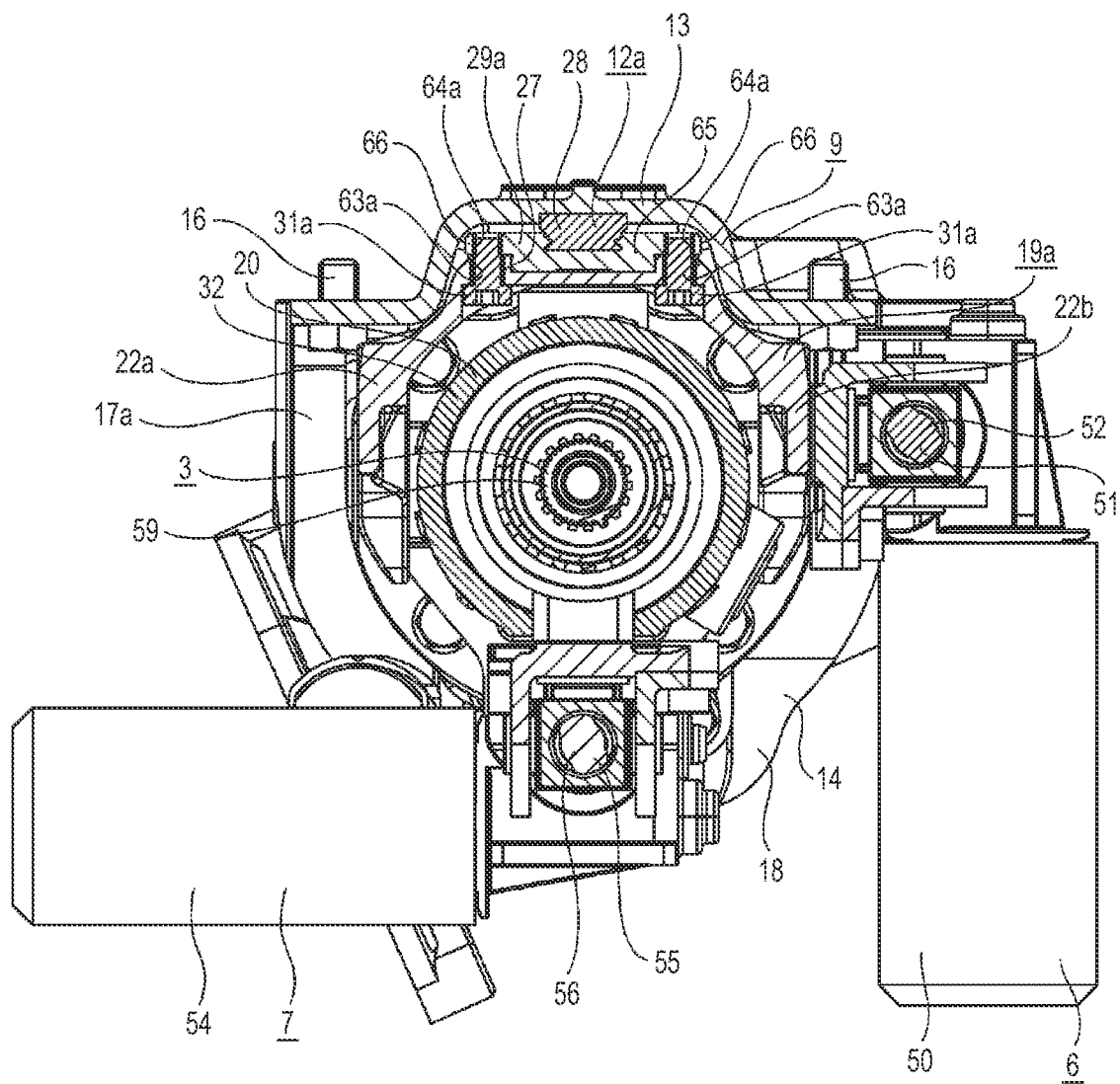
FIG. 17 is a view showing a second example of the embodiment of the present invention and corresponding to FIG. 9.
Figure 18:
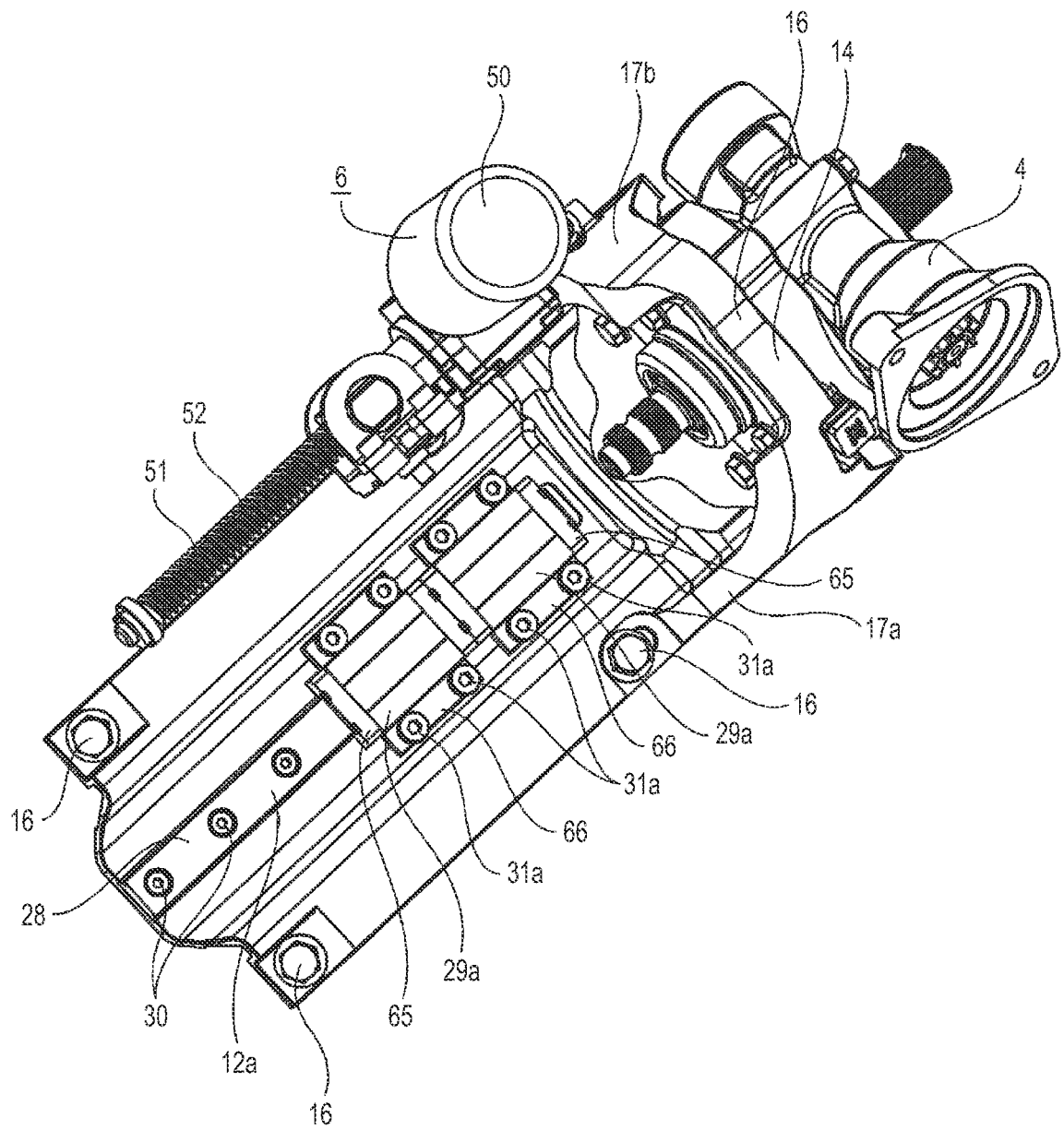
FIG. 18 is a perspective view showing a fixing bracket, a lower telescopic actuator, a reaction force applying device, and a linear guide, which are taken out from a steering device according to the second example of the embodiment of the present invention.
Figure 19:
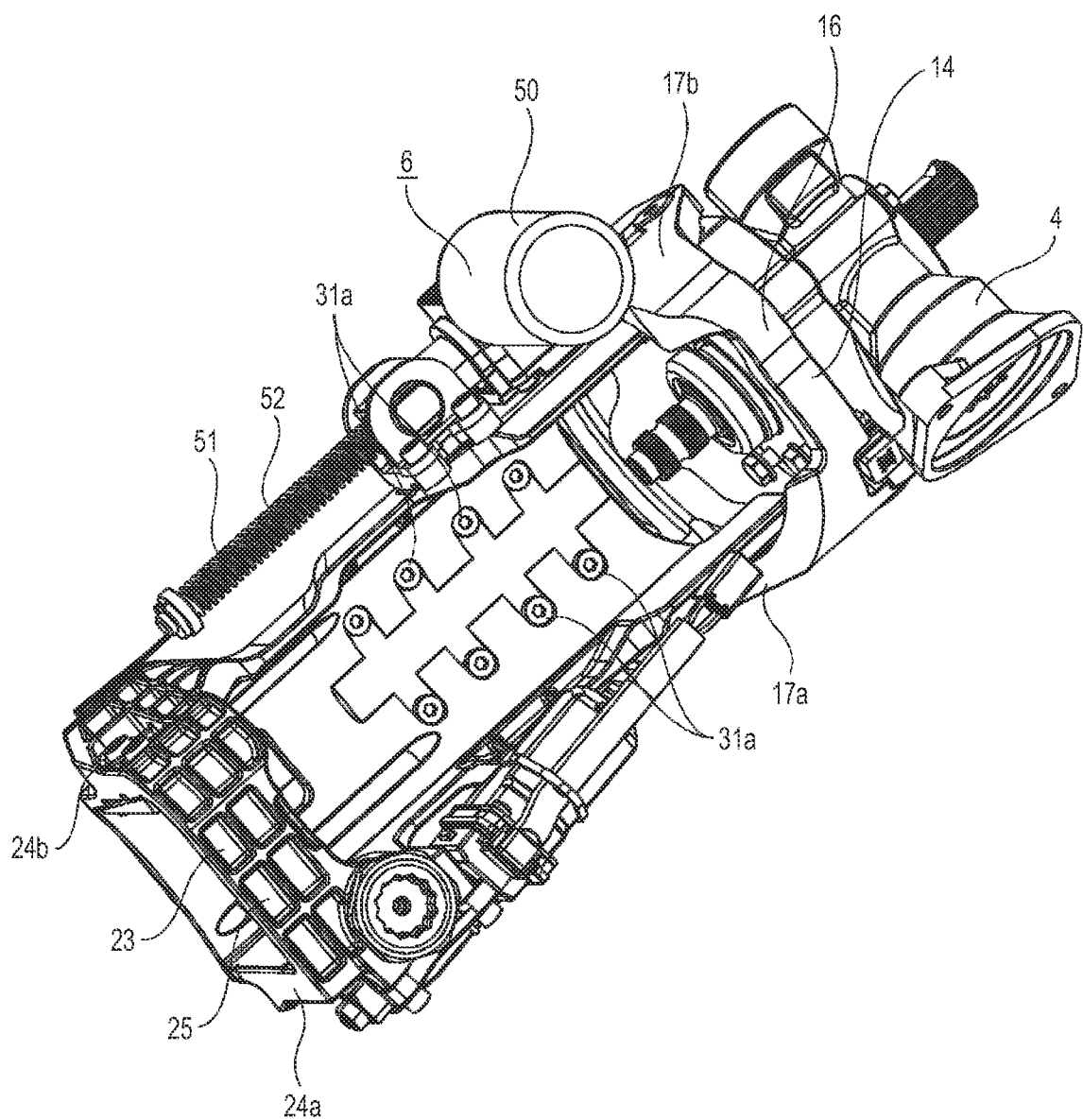
FIG. 19 is a perspective view showing the fixing bracket, a displacement bracket, the lower telescopic actuator, the reaction force applying device, and the linear guide, which are taken out from the steering device according to the second example of the embodiment of the present invention.

A second example of the embodiment of the present invention will be described with reference to FIGS. 17 to 19. The steering column device 2 of the present example is different from the steering column device 2 of the first example of the embodiment in a support structure of a slider 29a constituting a linear guide 12a with respect to a displacement bracket 19a. Specifically, a position of a support bolt 31a for supporting the slider 29a with respect to the displacement bracket 19a is located outward in the width direction than that in the first example of the embodiment.

The displacement bracket 19a has through holes 63a, each of which penetrates the displacement plate portion 21 in the upper-lower direction, at a plurality of axial locations on each of two sides in the width direction sandwiching the central axis of the steering column 5a in the displacement plate portion 21. In the present example, the through holes 63a are formed at a plurality of axial locations on each of two sides in the width direction sandwiching a portion in which the recessed portion 27 is formed in the displacement plate portion 21.

The slider 29a of the linear guide 12a has a substantially rectangular columnar shape, and includes a main body portion 65 having, on an upper surface thereof, an engaging portion engaged with the guide rail 28 in a manner of being displaceable in the axial direction along the guide rail 28; and a pair of flange portions 66 protruding outward in the width direction from upper end portions of both side surfaces in the width direction of the main body portion 65. The slider 29a has screw holes 64a at a plurality of axial locations on a lower surface of each of the flange portions 66.

The slider 29a is supported and fixed to the upper surface of the displacement bracket 19a by screwing support bolts 31a inserted into the through holes 63a from below into screw holes 64a formed in the flange portions 66 in a state where a lower portion of the main body portion 65 is engaged (disposed) with an inside of the recessed portion 27 of the displacement bracket 19a.

In the present example, the position of the support bolt 31a for supporting the slider 29a with respect to the displacement bracket 19a is located outward in the width direction than that in the first example of the embodiment. Therefore, it is easy to secure the support rigidity of the slider 29a with respect to the displacement bracket 19a. Further, a sufficient distance (clearance) in the upper-lower direction can be ensured between a head portion of the support bolt 31a and an upper surface of the lower column 20. As a result, a swingable amount (an amount of adjustment in the upper-lower position of the steering wheel) of the lower column 20 in the upper-lower direction with respect to the displacement bracket 19a can be sufficiently secured. The configuration and the operation and effect of other portions are the same as those of the first example of the embodiment.

Third Example of Embodiment

Figure 20:
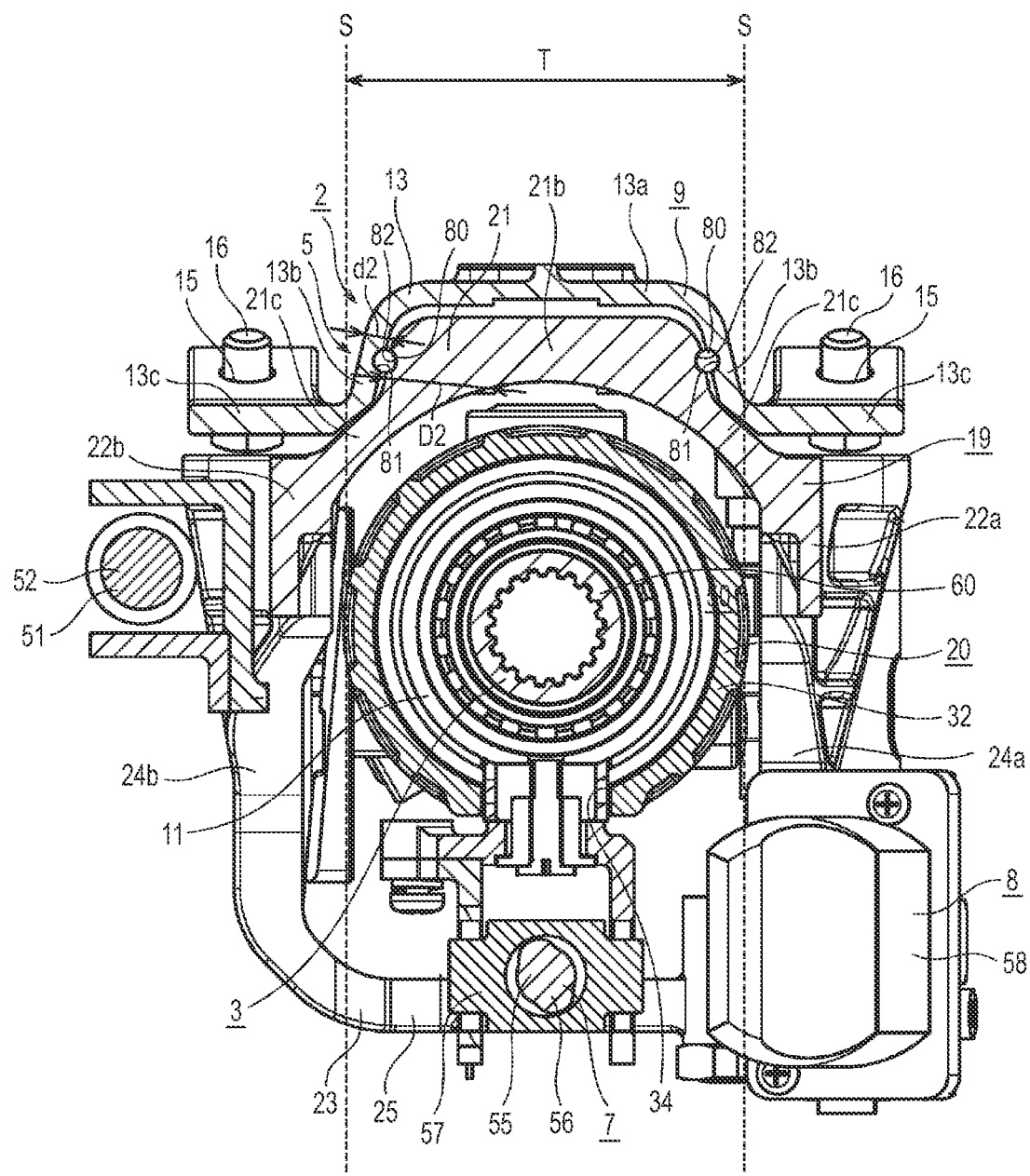
FIG. 20 is a cross-sectional view showing a steering device according to a third example of the embodiment of the present invention and corresponds to FIG. 7.

A third example of the embodiment of the present invention will be described. FIG. 20 is a cross-sectional view showing the steering device according to the present embodiment, and corresponds to FIG. 7. In the present example, rolling members 80 as the low-friction sliding member are disposed between the fixing bracket 9 and the displacement bracket 19. The rolling members 80 are shown spherical or columnar rolling elements made of steel. In the shown example, the spherical rolling element is applied.

The pair of bent portions 13b of the fixing plate portion 13 of the fixing bracket 9 and the pair of thick portions 21b of the displacement plate portion 21 of the displacement bracket 19 face each other in the width direction. Groove portions 82, 81 in which the rolling member 80 can be disposed are formed on facing surfaces between the pair of bent portions 13b and the pair of thick portions 21b, respectively. Further, the rolling member 80 is disposed between the groove portions 82, 81. The number of rolling members 80 is not particularly limited, and a plurality of rolling members 80 may be arranged in the front-rear direction.

In this way, the displacement bracket 19 is supported by the rolling members 80 in a manner of being displaceable relative to the fixing bracket 9 in the axial direction. The present embodiment is similar to the linear guides 12, 12a of the first and second examples of the embodiment in that a rolling mechanism is used as the low-friction sliding member. However, in the present embodiment, since the pair of rolling members 80 are disposed at two locations (the pair of bent portions 13b) in the width direction of the fixing bracket 9 so as to face each other in the width direction with the thick portion 21b interposed therebetween, and the fixing bracket 9 and the displacement bracket 19 have interference in the width direction and the upper-lower direction, movement other than relative movement in the axial direction can be restricted. Further, according to the present embodiment, since the number of components can be reduced and the structure can be simplified as compared with the case where the linear guides 12, 12a are used as in the first example and the second example of the embodiment, the cost can be reduced while having the same characteristics as those of the linear guides 12, 12a.

Here, it is preferable that the pair of rolling members 80 are disposed inward of the outer peripheral surface of the lower column 20 in the width direction. In FIG. 20, a pair of virtual planes S that are in contact with both end portions in the width direction of the outer peripheral surface of the lower column 20 and extend in the upper-lower direction are indicated by broken lines. The pair of rolling members 80 are disposed in the region T sandwiched between the pair of virtual planes S in the width direction. Therefore, the steering column device can be made compact in the width direction as compared with a case where the pair of rolling members 80 are disposed outward of the outer peripheral surface of the lower column 20 in the width direction.

Further, as described above, since the pair of rolling members 80 are disposed in the thick portion 21b of the displacement plate portion 21 of the displacement bracket 19, sufficient rigidity can be secured.

Further, at a portion adjacent to a location at which the rolling member 80 is disposed, a thickness of the thick portion 21b of the displacement plate portion 21 of the displacement bracket 19 is set to be larger than a thickness of the bent portion 13b of the fixing bracket 9. More specifically, in a direction perpendicular to a sliding direction (front-rear direction) of the rolling member 80 and a direction in which the displacement of the rolling member 80 is restricted by the groove portions 82, 81 (a direction in which the bent portion 13b extends), a thickness D2 of a portion of the thick portion 21b adjacent to the location at which the rolling member 80 is disposed (groove portion 82) is set to be larger than a thickness d2 of a portion of the bent portion 13b adjacent to the location at which the rolling member 80 is disposed (groove portion 81). Accordingly, the steering column device 2 is made compact in the width direction, and the rigidity of the steering column device 2 can be ensured.

In the present example, the fixing bracket 9 and the column holder 10 (displacement bracket 19) are assembled via the rolling members 80, but alternatively or additionally, the column holder (lower column) and the upper column can also be assembled via the rolling members 80.

Fourth Example of Embodiment

Figure 21:
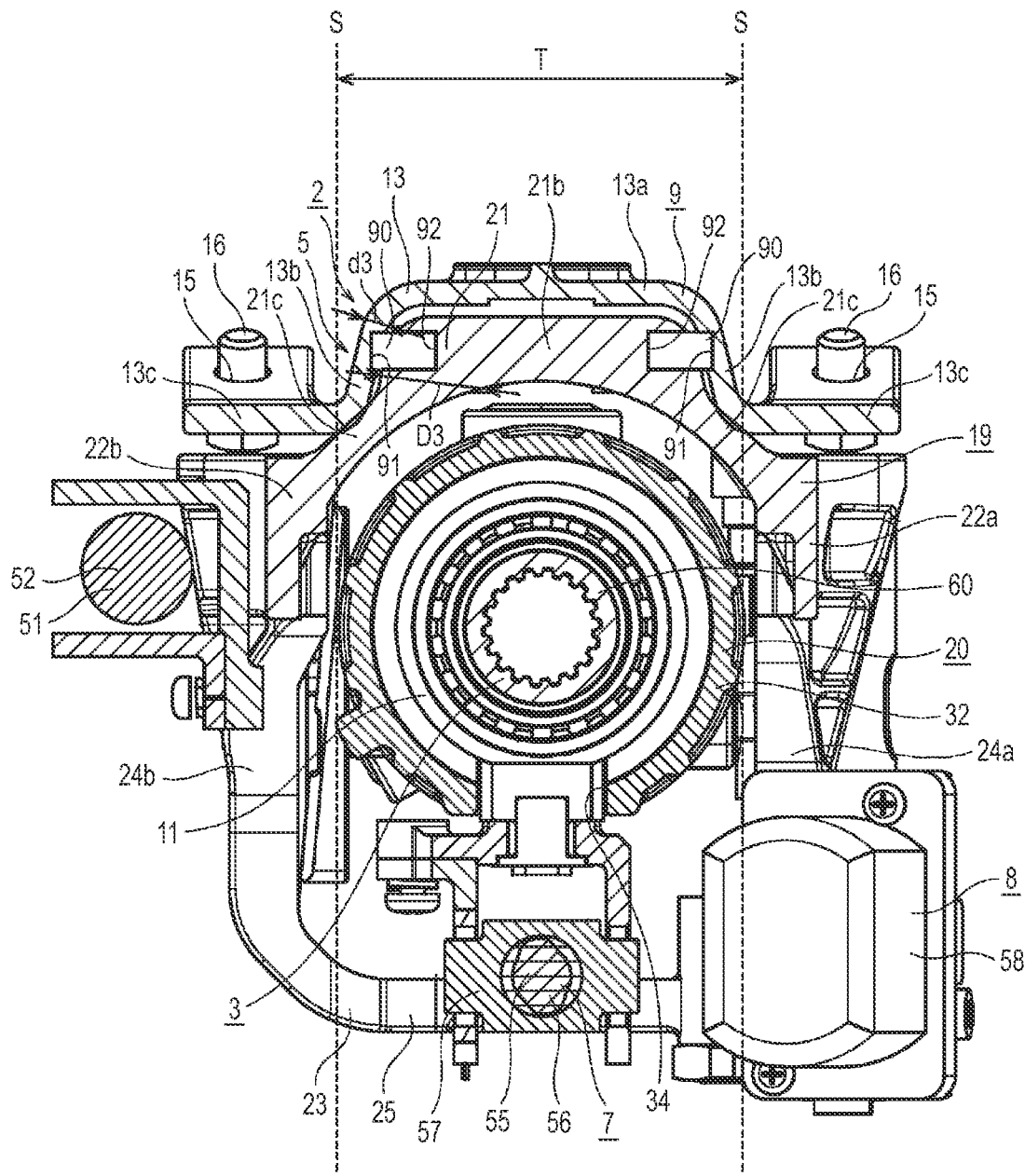
FIG. 21 is a cross-sectional view showing a steering device according to a fourth example of the embodiment of the present invention and corresponds to FIG. 7.

A fourth example of the embodiment of the present invention will be described. FIG. 21 is a cross-sectional view showing the steering device according to the present embodiment, and corresponds to FIG. 7. In the present example, sliding members 90 as the low-friction sliding member are disposed between the fixing bracket 9 and the displacement bracket 19. The sliding member 90 of the present example has a rectangular parallelepiped shape that has a rectangular cross section and extends in the front-rear direction, but the shape thereof is not limited. The sliding member 90 is fixed to one of the fixing bracket 9 and the displacement bracket 19, and slides while being guided by the other of the fixing bracket 9 and the displacement bracket 19, thereby enabling relative movement between the fixing bracket 9 and the displacement bracket 19 in the axial direction.

The pair of bent portions 13b of the fixing plate portion 13 of the fixing bracket 9 and the pair of thick portions 21b of the displacement plate portion 21 of the displacement bracket 19 face each other in the width direction, and groove portions 92, 91 in which the sliding member 90 can be disposed are formed in facing surfaces between the pair of bent portions 13b and the pair of thick portions 21b, respectively. Further, the sliding member 90 is disposed between the groove portions 92, 91. The sliding member 90 is fixed to one of the groove portions 92, 91 by fitting, welding, adhesion, or the like, and is slidable while being guided by the other. Friction during movement can be reduced by using a self-lubricating resin such as polytetrafluoroethylene resin (PTFE) for the sliding member 90. As the material of the sliding member 90, a material other than the self-lubricating resin may be appropriately selected and adopted.

In this way, the displacement bracket 19 is guided and supported by the sliding members 90 in a manner of being displaceable relative to the fixing bracket 9 in the axial direction. In the present embodiment, since the pair of sliding members 90 are disposed at two locations (the pair of bent portions 13b) in the width direction of the fixing bracket 9 so as to face each other in the width direction with the thick portion 21b interposed therebetween, and the fixing bracket 9 and the displacement bracket 19 have interference in the width direction and the upper-lower direction, movement other than relative movement in the axial direction can be restricted. Further, according to the present embodiment, since the number of components can be reduced and the structure can be simplified as compared with the case where the linear guides 12, 12a are used as in the first example and the second example of the embodiment, the cost can be reduced while having the same characteristics as those of the linear guides 12, 12a.

Here, it is preferable that the pair of sliding members 90 are disposed inward of the outer peripheral surface of the lower column 20 in the width direction. In FIG. 21, a pair of virtual planes S that are in contact with both end portions in the width direction of the outer peripheral surface of the lower column 20 and extend in the upper-lower direction are indicated by broken lines. The pair of sliding members 90 are disposed in the region T sandwiched between the pair of virtual planes S in the width direction. Therefore, the steering column device 2 can be made compact in the width direction as compared with a case where the pair of sliding members 90 are disposed outward of the outer peripheral surface of the lower column 20 in the width direction.

Further, as described above, since the pair of sliding members 90 are disposed in the thick portion 21b of the displacement plate portion 21 of the displacement bracket 19, sufficient rigidity can be secured.

Further, at a portion adjacent to a location at which the sliding member 90 is disposed, a thickness of the thick portion 21b of the displacement plate portion 21 of the displacement bracket 19 is set to be larger than a thickness of the bent portion 13b of the fixing bracket 9. More specifically, in a direction perpendicular to a sliding direction (front-rear direction) of the sliding member 90 and a direction in which the displacement of the sliding member 90 is restricted by the groove portions 92, 91 (a direction in which the bent portion 13b extends), a thickness D3 of a portion of the thick portion 21b adjacent to the location at which the sliding member 90 is disposed (groove portion 92) is set to be larger than a thickness d3 of a portion of the bent portion 13b adjacent to the location at which the sliding member 90 is disposed (groove portion 91). Accordingly, the steering column device 2 is made compact in the width direction, and the rigidity of the steering column device 2 can be ensured.

In the present example, the fixing bracket 9 and the column holder 10 (displacement bracket 19) are assembled via the sliding members 90, but alternatively or additionally, the column holder (lower column) and the upper column can also be assembled via the sliding members 90.

REFERENCE SIGNS LIST

1: steering device
2: steering column device
3: steering shaft
4: reaction force applying device
5: steering column
6: lower telescopic actuator
7: upper telescopic actuator
8: tilt actuator
9: fixing bracket
10: column holder
11: upper column
12, 12a: linear guide (low-friction sliding member)
13: fixing plate portion
13a: base portion
13b: bent portion
13c: flange portion
14: fixing-side bracket portion
15: through hole
16: mounting bolt
17a, 17b: fixing-side side plate portion
18: fixing-side connecting portion
19, 19a: displacement bracket
20: lower column
21: displacement plate portion
21b: thick portion
21c: thin portion
22a, 22b: hanging plate portion
23: swing support bracket portion
24a, 24b: displacement-side side plate portion
25: displacement-side connecting portion
26: recessed groove
27: recessed portion
28: guide rail
29, 29a: slider
30: support bolt
31, 31a: support bolt
32: large diameter portion
33: small diameter portion
34: slit
35a, 35b: screw hole
36a, 36b: pad
37a, 37b: screw plug
38: tilt feed screw device
39: inner column
40: housing
41: screw shaft
42: pivot shaft portion
43: nut
44: bearing device
45: cylindrical portion
46: flange portion
47: through hole
48: fixing bolt
49: pivot bolt
50: lower telescopic motor
51: lower feed screw device
52: screw shaft
53: nut
54: upper telescopic motor
55: upper feed screw device
56: screw shaft
57: nut
58: tilt motor
59: inner shaft
60: outer shaft
61a, 61b: radial rolling bearing
63, 63a: through hole
64, 64a: screw hole
65: main body portion
66: flange portion
67: steering system
68: steering wheel
69: steered wheel
70: wheel turning device
71: actuator
72: tie rod
80: rolling member (low-friction sliding member)
81, 82: groove portion
90: sliding member (low-friction sliding member)
91, 92: groove portion
S: virtual plane
D1, D2, D3: thickness
d1, d2, d3: thickness

The invention claimed is:

1. A steering column device comprising:
a steering column; and
a telescopic actuator, wherein:
the steering column includes:
a first column member;
a second column member assembled to the first column member in a manner of being displaceable relative to the first column member in an axial direction; and
a low-friction sliding member disposed between the first column member and the second column member;
the telescopic actuator includes a telescopic motor, and displaces the second column member in the axial direction with respect to the first column member by using the telescopic motor as a drive source;
the low-friction sliding member is a linear guide;
the linear guide includes:
a guide rail extending along the axial direction; and
a slider assembled to the guide rail in a manner of being displaceable in the axial direction along the guide rail;
the linear guide is disposed between the first column member and the second column member;
the second column member has a through hole, which penetrates in an upper-lower direction, in an upper portion thereof;
the slider has a screw hole opened to a lower surface thereof, and is supported and fixed to an upper surface of the second column member by screwing a support bolt inserted into the through hole from below with the screw hole; and
the guide rail is supported and fixed to a lower surface of the first column member.

2. The steering column device according to claim 1, wherein:
the steering column includes the first column member, a column holder assembled to the first column member in a manner of being displaceable relative to the first column member in the axial direction, and an upper column assembled to the column holder in a manner of being displaceable relative to the column holder in the axial direction, and the low-friction sliding member is disposed at least between the first column member and the column holder or between the column holder and the upper column; and the steering column device further comprises:

a lower telescopic actuator including a lower telescopic motor and configured to displace the column holder in the axial direction with respect to the first column member by using the lower telescopic motor as a drive source; and an upper telescopic actuator including an upper telescopic motor and configured to displace the upper column in the axial direction with respect to the column holder by using the upper telescopic motor as a drive source.

3. The steering column device according to claim 2, wherein:

the column holder includes the second column member supported by the first column member in a manner of being displaceable relative to the first column member in the axial direction, and a lower column supported by the second column member in a manner of being swingable relative to the second column member in an upper-lower direction; and the steering column device further comprises:

a tilt actuator including a tilt motor and configured to displace the lower column in the upper-lower direction with respect to the second column member by using the tilt motor as a drive source.

4. The steering column device according to claim 1, wherein:

the steering column includes the first column member, a column holder assembled to the first column member in a manner of being displaceable relative to the first column member in the axial direction, and an upper column assembled to the column holder in a manner of being displaceable relative to the column holder in the axial direction;

the column holder includes the second column member supported by the first column member in a manner of being displaceable relative to the first column member in the axial direction, and a lower column supported by the second column member in a manner of being swingable relative to the second column member in an upper-lower direction; and the low-friction sliding member is disposed inward of an outer peripheral surface of the lower column in a width direction.

5. The steering column device according to claim 4, wherein:

the low-friction sliding member is disposed between the first column member and the second column member;

the second column member has a thick portion; and the low-friction sliding member is disposed at the thick portion.

6. The steering column device according to claim 5, wherein the thick portion is disposed inward of the outer peripheral surface of the lower column in the width direction.

7. The steering column device according to claim 5, wherein a thickness of a portion of the thick portion adjacent to a location at which the low-friction sliding member is disposed is larger than a thickness of a portion of the first column member adjacent to the location at which the low-friction sliding member is disposed.

8. The steering column device according to claim 1, wherein the through hole is disposed in each of both side portions in a width direction so as to sandwich a central axis of the steering column, and the screw hole is disposed in each of both side portions in the width direction so as to sandwich the central axis of the steering column.

9. A steering column device comprising:

a steering column; and a telescopic actuator, wherein:

the steering column includes:

a first column member;

a second column member assembled to the first column member in a manner of being displaceable relative to the first column member in an axial direction; and a low-friction sliding member disposed between the first column member and the second column member;

the telescopic actuator includes a telescopic motor, and displaces the second column member in the axial direction with respect to the first column member by using the telescopic motor as a drive source;

the steering column includes the first column member, a column holder assembled to the first column member in a manner of being displaceable relative to the first column member in the axial direction, and an upper column assembled to the column holder in a manner of being displaceable relative to the column holder in the axial direction;

the column holder includes the second column member supported by the first column member in a manner of being displaceable relative to the first column member in the axial direction, and a lower column supported by the second column member in a manner of being swingable relative to the second column member in an upper-lower direction;

the low-friction sliding member is disposed inward of an outer peripheral surface of the lower column in a width direction;

the low-friction sliding member is disposed between the first column member and the second column member;

the second column member has a thick portion; and the low-friction sliding member is disposed at the thick portion.

10. The steering column device according to claim 9, wherein the low-friction sliding member is a rolling member.

11. The steering column device according to claim 10, wherein the rolling member is disposed at two locations in a width direction so as to face each other in the width direction.

12. The steering column device according to claim 9, wherein the low-friction sliding member is a sliding member.

13. The steering column device according to claim 12, wherein the sliding member is disposed at two locations in a width direction so as to face each other in the width direction.

* * * * *